US006320966B1

(12) United States Patent
Brands

(10) Patent No.: US 6,320,966 B1
(45) Date of Patent: Nov. 20, 2001

(54) CRYPTOGRAPHIC METHODS FOR DEMONSTRATING SATISFIABLE FORMULAS FROM PROPOSITIONAL LOGIC

(76) Inventor: Stefanus A. Brands, V.d. Mondestraat 75, NL-3515 BC Utrecht (NL)

(*) Notice: Subject to any disclaimer, the term of this patent is extended or adjusted under 35 U.S.C. 154(b) by 0 days.

(21) Appl. No.: 09/065,051

(22) PCT Filed: Oct. 23, 1996

(86) PCT No.: PCT/NL96/00413

§ 371 Date: Jun. 16, 1998

§ 102(e) Date: Jun. 16, 1998

(87) PCT Pub. No.: WO97/16903

PCT Pub. Date: May 9, 1997

(51) Int. Cl.[7] ........................................................ H04L 9/00
(52) U.S. Cl. ............................ 380/59; 380/255; 713/150; 713/168
(58) Field of Search ................................. 380/255, 286, 380/59; 705/75; 713/150, 168

(56) References Cited

FOREIGN PATENT DOCUMENTS

| 0383985 | 8/1990 | (EP) . |
| 0661846 | 7/1995 | (EP) . |
| 9504417 | 2/1995 | (WO) . |

OTHER PUBLICATIONS

Okamoto, Provably Secure and Practical Identification Schemes and Corresponding Signature Schemes, Crypto '92, Springer, 1992, pp. 31–53.*

Brands, Rapid Demonstration of Linear Relations Connected by Boolean Operators, Eurocrypt '97, Springer, 1997, pp. 318–333.*

Chaum, Cryptographically Strong Undeniable Signatures, Unconditionally Secure for the Signer, Crypto '91, Springer, pp. 470–484.*

Boyar et al., "Subquadratic Zero–Knowledge," Proceedings: 32nd Annual Symposium on Foundations of Computer Science, San Juan, Puerto Rico, Oct. 1, 1991, pp. 69–78.

Aumann et al., "One Message Proof Systems with Known Space Verifiers," 13th Annual International Cryptology Conference, Berlin, Germany, Aug. 22, 1993, pp. 85–99.

* cited by examiner

*Primary Examiner*—Gail Hayes
*Assistant Examiner*—Jeffrey S Leaning
(74) *Attorney, Agent, or Firm*—Kevin Pillay; Fasken Martineau DuMoulin LLP

(57) ABSTRACT

Cryptographic methods are disclosed, which allow a prover party, who holds a number of secrets, to demonstrate satisfiable formulas of propositional logic, wherein the atomic propositions are linear relations between the secrets. The demonstration reveals no more information than is contained in the formula itself. Some implementations allow an unlimited number of such demonstrations to be made, without revealing any additional information about the secrets, whereas other implementations ensure that the secrets, or some of the secrets, will be revealed, if a demonstration is performed more than a predetermined number of times. The demonstrations may be zero-knowledge proofs, or signed proofs.

34 Claims, 6 Drawing Sheets

CRYPTOGRAPHIC METHODS FOR DEMONSTRATING SATISFIABLE FORMULAS FROM PROPOSITIONAL LOGIC

BACKGROUND OF THE INVENTION

1. Field of the Invention

This invention relates to secure cryptographic methods for demonstrating characteristics of privately held data, and more specifically to methods for demonstrating formulas from propositional logic without revealing additional information.

2. Description of the Prior Art

U.S. Pat. No. 5,521,980, filed Feb. 28, 1994, by the present applicant, describes and claims apparatus for demonstrating characteristics of privately held data without revealing additional information. In particular it describes how a prover party, holding one or more secrets, can securely demonstrate a relation that is linear in the secrets. A special case of demonstrating a linear relation pertains to demonstrating that a secret has a certain value.

In one application the privately held data represents a set of credentials that have been issued by some authorized party, and the prover party demonstrates that its credentials have a particular value or that a linear relation applies to the credentials, without revealing additional information. By denoting the absence of a credential by a specially appointed value, typically zero, and its presence by another, typically one, the prover party can demonstrate in this manner that it has or does not have that credential, by demonstrating that the secret representing the credential is one or zero, respectively. Similarly, it can demonstrate possession of exactly one of two such credentials, by demonstrating that the sum of the respective secrets equals 1. In general, in this manner possession of exactly $1 \geq 0$ out of $k \geq 1$ credentials can be demonstrated.

While the credential issuing and updating methods described in U.S. Pat. No. 5,521,980 are quite powerful, the method for demonstrating linear relations is seriously limited in functionality.

To demonstrate a system consisting of more than just a single linear relation, it would seem that the method described in U.S. Pat. No. 5,521,980 must be applied repeatedly, once for each relation. It would be desirable to have a method that allows any system of linear relations to be demonstrated by the prover party, without revealing additional information, and without significantly degrading efficiency.

The methods of U.S. Pat. No. 5,521,980 also cannot be applied to demonstrate that a credential that can take on many values does not have a certain value, without revealing information about its actual value.

The method for demonstrating possession of exactly 1 out of k credentials only applies to yes/no credentials, and does not allow one to demonstrate that one has at least 1 out of k credentials.

More generally, the methods in U.S. Pat. No. 5,521,980 do not allow to demonstrate arbitrary satisfiable formulas from so-called propositional logic for linear relations; these are formulas that connect atomic propositions by the logical connectives "AND," "OR," and "NOT," the atomic propositions being linear relations over a finite field. "Satisfiable" in this context means that there exists an assignment to the variables in the atomic propositions, such that the formula becomes true. An example of such a formula is "($S_1$ AND $S_2$) OR ($S_3$ AND (NOT $S_4$))," where each of $S_1, \ldots, S_4$ denotes one linear relation involving numbers $x_1, \ldots, x_k$; the formula is satisfiable if there is an assignment to $(x_1, \ldots, x_k)$ such that the formula becomes true. In this interpretation, the methods in U.S. Pat. No. 5,521,980 only allow to demonstrate formulas that connect linear relations by zero logical connectives; it does not allow demonstration of formulas that have one or more logical connectives.

A method is known in the art (see, Cramer, R., Damgard, I., and Schoenmakers, B., "Proofs of Partial Knowledge and Simplified Design of Witness Hiding Protocols," Advances in Cryptology—CRYPTO '94, Lecture Notes in Computer Science, Springer-Verlag, 1995) that allows the prover party to demonstrate, for example, that it knows secret keys corresponding to a second and a third public key, or to a fifth public key, without revealing more than that. This method, however, only allows to demonstrate monotone formulas, which are formulas with only "AND" and "OR" connectives: the "NOT" connective cannot be dealt with. More importantly, the atomic propositions for this method are of the form "The prover party knows a secret key corresponding to the i-th public key," instead of linear relations between secrets.

U.S. Pat. No. 5,521,980 also describes a method for enabling the set of credentials, or part thereof, to be computed by the verifier party in case the prover party demonstrates the exact same linear relation more than once (or, more generally, more times than a predetermined limit). This method requires the prover party to know beforehand which particular linear relation it will have to demonstrate, which is often not desirable. Furthermore it would be desirable to have a method whereby the verifier party is able to compute the set of credentials, or a part thereof, in case the prover party demonstrates any two formulas from propositional logic (i.e., not necessarily the same) for the set of credentials, or any two formulas out of a special category of all such formulas.

Furthermore, the methods in U.S. Pat. No. 5,521,980 do not make any other distinction than between zero-knowledge proofs and signed proofs of formulas. They do not distinguish between how much of the verifier party's conviction can be passed on in case a signed proof was provided, in other words between different flavors of signed proof. In particular, in some cases it may be desirable that the verifier party can pass on its conviction that the prover party knows a set of secrets, but not any information about the formula that has been demonstrated by the prover party; in other cases the verifier party may need to be able to pass on its conviction that the prover party knows a set of secrets, and that the prover party has demonstrated one formula out of a subclass of formulas, without convincing of which one; and in still other cases the verifier party may need to be able to pass on its conviction that the prover party knows a set of secrets, as well as its conviction of the particular formula that the prover party has demonstrated.

The method described in U.S. Pat. No. 5,521,980 for demonstrating linear relations moreover requires the prover party to demonstrate knowledge of a representation with respect to a set of numbers. This set of numbers depends on the particular relation that has to be demonstrated. It would be desirable to have a method for which the set of numbers is always the same, regardless of the formula that has to be demonstrated. This would allow efficient use of the well-known simultaneous repeated squaring technique (see, for example, exercise 27 on page 465 of Knuth, D., "The Art of Computer Programming," Volume 2/Seminumerical Algorithms, second edition, Addison-Wesley Publishing Company) because only a single table would be needed, containing for each non-empty subset of the set of numbers the product of the numbers in the subset, which could easily be pre-computed once and then stored.

OBJECTS OF THE INVENTION

Accordingly, it is an object of the present invention to:

allow a prover party to demonstrate any system of linear relations pertaining to a set of privately held secrets, without revealing additional information about the secrets;

allow a prover party to demonstrate that a linear relation does not pertain to a set of privately held secrets, without revealing additional information about the secrets;

allow a prover party to demonstrate that a set of privately held secrets satisfies at least some of a specified set of linear relations, without revealing additional information about the secrets;

allow a prover party to demonstrate arbitrary satisfiable formulas from propositional logic, atomic propositions being linear relations pertaining to a set of privately held secrets of the prover party, without revealing additional information about the secrets;

enable a verifier party to compute the set of privately held secrets of a prover party, or some of these secrets, if and only if the prover party engages more than a predetermined number of times for its set of secrets in the demonstration of a formula from a predetermined category of satisfiable formulas from propositional logic, atomic propositions being linear relations pertaining to the secrets;

allow, in any one of the above objects, the verifier party to restrictively blind the demonstration performed by the prover;

allow, in any one of the above objects, the verifier party to fully blind the demonstration performed by the prover;

allow, in any of the above objects, the prover party to perform its demonstration as a zero-knowledge proof;

allow, in any one of the first seven of the above objects, the prover party to perform its demonstration as a signed proof, in such a manner that the verifier party can subsequently pass on its conviction that the prover party knows a set of secrets, and its conviction of the formula that has been demonstrated by the prover party;

allow, in any one of the first seven of the above objects, the prover party to perform its demonstration as a signed proof, in such a manner that the verifier party can subsequently pass on its conviction that the prover party knows a set of privately held secrets, but not of the formula that has been demonstrated by the prover party;

allow, in any one of the first seven of the above objects, the prover party to perform its demonstration as a signed proof, in such a manner that the verifier party can subsequently pass on its conviction that the prover party knows a set of privately held secrets and that the prover party has demonstrated one formula out of a restricted class of formulas, without convincing of which particular formula:

allow, in any one of the three foregoing objects, the prover party to perform its signed proof without interacting with the verifier party;

allow, in any of the above objects, the prover party to be implemented by two sub-parties that have mutually conflicting interests, in such a manner that each sub-party knows only some of the secrets of the prover party;

allow efficient computation for the prover party and the verifier party in the above objects, by guaranteeing that simultaneous repeated squaring can be applied using a single pre-computed table;

enable use of the above objects of the invention in privacy-protecting credential mechanisms;

allow efficient, economical, and practical apparatus and methods fulfilling the other objects of the invention.

Other features, objects, and advantages of this invention will be appreciated when the description and appended claims are read in conjunction with the figures.

DETAILED DESCRIPTION OF THE INVENTION

Figure 1:
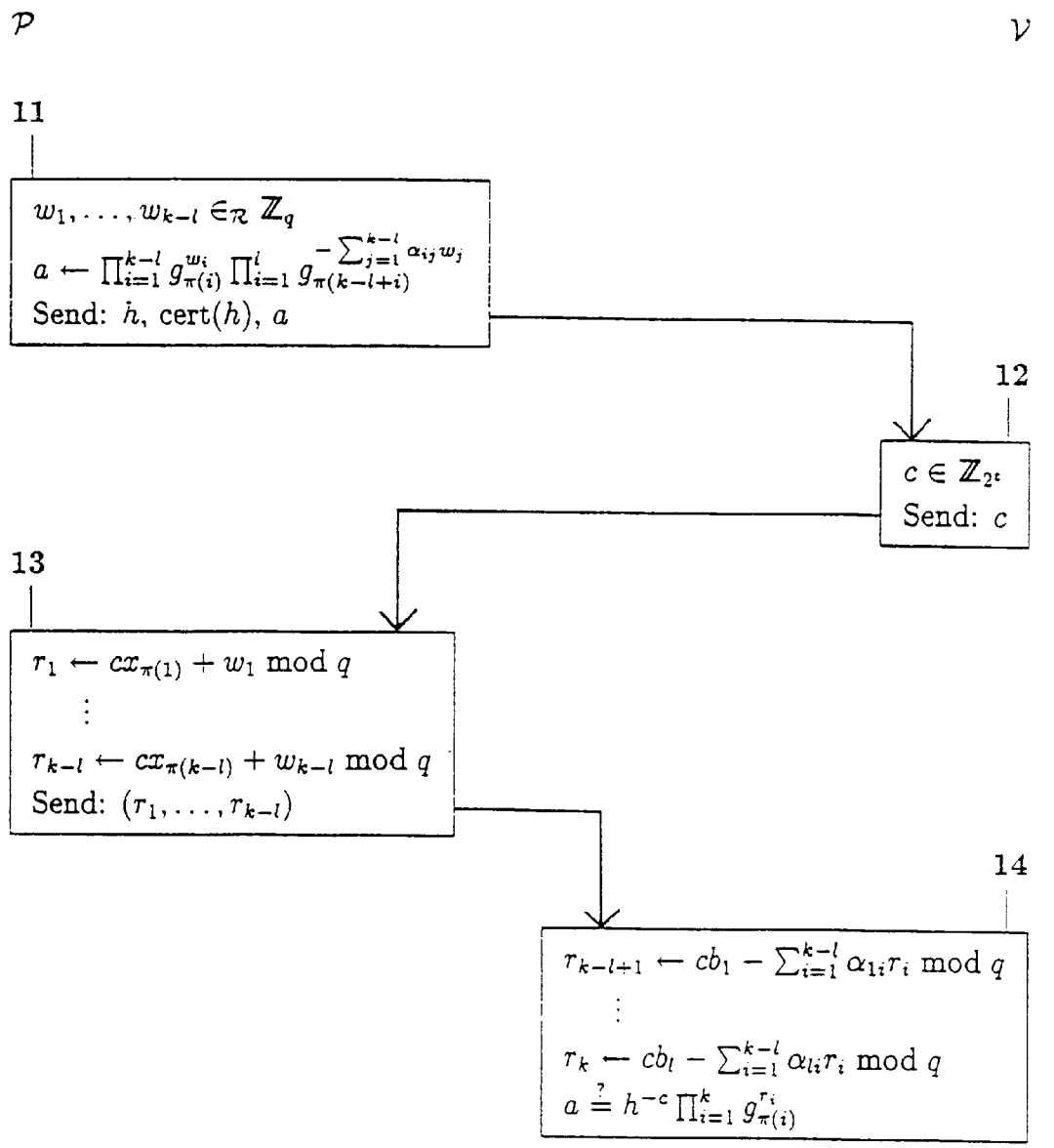
FIG. 1 shows a flowchart of a first protocol for demonstrating that a system of linear relations pertains to a set of secrets, without revealing additional information about the secrets, in accordance with the teachings of the present invention.

While it is believed that the notation of FIGS. 1 to 6 would be clear to those of ordinary skill in the art, it is first reviewed here for definiteness.

The figures describe protocols between a prover party and a verifier party, denoted in the figures and in the accompanying descriptions by P and v, respectively. The actions performed by the parties are grouped together into flowchart boxes. The party performing the actions described in a flowchart box is indicated at the top of the column that the box is in. Each line in a box describes a step, such as a computation, a transmittal or a storage action. Flowcharts must be read box by box, in accordance with the attached numbers, and, within boxes, line by line. The term "party" indicates an entity, and might sometimes be regarded as an agent who performs a step or a collection of steps in a protocol. It might also be regarded as a means for performing those steps, and might be comprised of any suitable configuration of digital logic circuitry. For example, any box or collection of boxes from the figures could be realized by hard-wired and dedicated combinatorial logic, or by some sort of suitably programmed machine, a microprocessor for instance, such as are well-known in the art, just as long as it is able to perform the storage, input/output and transformational steps (possibly apart from the random source functions) described by the corresponding box or boxes.

The symbol "←" denotes assignment, meaning that the variable or symbol on its left-hand side is assigned the value or values on its right-hand side to. Assignments do not necessarily imply the reservation of storage space, but can refer to intermediate computations performed in random-access memory.

A test for equality is indicated by the symbol "$\underline{?}$." Unless specified otherwise, the present invention is not concerned with what should happen, in case an indicated equality does not hold. For definiteness the protocol can be assumed to halt in such a case.

The symbol "$\in_R$" indicates that the number or numbers on its left-hand side are chosen from the set on its right-hand side according to a probability distribution that is substantially uniform and independent. In practice a physical random number generator can be used, possibly in conjunction with additional post-processing, or a deterministic pseudo-random number generator. In the latter case all random numbers generated by a device may be derived from a single secret, for example by diversifying the secret by a sequence number and/or type specifier indicative of the random number to be generated.

The word "Send," followed by a colon and at least one number, indicates that the at least one number is sent by the party performing the actions, described in the corresponding box, to the other party, indicated by the connections between the flowchart boxes.

For any integer, l, the symbol $\mathbb{Z}_l$, denotes the set of of numbers $\{0, \ldots, l-1\}$, called the ring of integers modulo l. (Of course, any other set of representatives can be taken instead, as will be clear to those of ordinary skill in the art.) Addition and multiplication of elements in $\mathbb{Z}_l$ are defined modulo l.

As in standard mathematical notation, the symbols "$\Pi$" and "$\Sigma$" denote product and sum, respectively, and they are always indexed. For example, $\Pi_{i=2}^4 x_i$ denotes the product $x_2 x_3 x_4$.

The standard (horizontal, vertical or diagonal) ellipsis notation from mathematics is used in cases where one or more numbers are formed according to the same rule, which can be logically inferred from the information preceding and succeeding the ellipsis. For example, the notation in the first three lines of Box 13 is to be interpreted as follows: if k−1 equals 1, then only a single relation is defined, namely that shown for $r_1$; if k−1 is greater than 1, then $r_2$ is computed as $r_2 \leftarrow cx_{\pi(2)} + w_2 \mod q$ and so on; and in the special case that k−1 is zero, no relation is defined. Likewise, the notation in the fourth line of Box 13 is to be interpreted as follows: if k−1 equals 1, then only a single number is sent, namely $r_l$; if k−1 is greater than 1, the numbers $r_1$ up to and including $r_{k-1}$ are sent; and in the special case that k−1 is zero, nothing is sent.

FIGS. 1 to 6 describe preferred embodiments based on the so-called Discrete Log assumption, well-known in the art. Initially a group is determined, denoted here by $G_q$, that contains q numbers, where q is a large prime number. Without loss of generality, the group operation in $G_q$ is assumed to be multiplication. Efficient algorithms should be available for recognizing, generating, testing equivalence of, and multiplying numbers in $G_q$, but not for computing discrete logarithms. An expression involving a number in $G_q$ and no explicit modulo operator indicates a computation in $G_q$. For computations in the ring $\mathbb{Z}_q$, the modulo operator is denoted explicitly.

Additionally, $k \geq 2$ so-called generators, $g_1, \ldots, g_k$, all in $G_q$ and unequal to 1, are selected. Using the terminology of U.S. Pat. No. 5,521,980 a representation of a number, h, in $G_q$, with respect to $(g_1, \ldots, g_k)$ is a vector of numbers, $(x_1, \ldots, x_k)$, all in $\mathbb{Z}_q$, such that h is equal to $\Pi_{i=1}^k g_i^{x_i}$. It is important that at least P cannot feasibly compute a representation of 1 with respect to $(g_1, \ldots, g_k)$ that differs from the all-zero representation $(0, \ldots, 0)$. Hereto the generators, $g_1, \ldots, g_k$, can, for example, be generated at random by a party trusted by v, or by v itself; this party may also specify the group $G_q$. As will be clear to those of ordinary skill in the art, it may not be needed to choose all generators in a substantially random manner; one of the generators may be chosen from a small set, for example amongst the first hundred prime numbers, as long as it is believed infeasible to compute discrete logarithms with respect to that generator.

The vector $(x_1, \ldots, x_k)$ is from now on referred to as the set of secrets of P. The inventive methods enable the P to demonstrate properties of its set of secrets, the properties being described by satisfiable formulas from propositional logic, atomic propositions being linear equations in the secrets.

The inventive methods require P to demonstrate knowledge of a representation of a number with respect to a vector of generators, the number and each generator being a product of powers of generators in the set $\{h, g_1, \ldots, g_k\}$, and the particular definition of products specifying the formula to be demonstrated. To demonstrate knowledge of a representation without revealing (useful) information about it, the protocol described by FIG. 18 of U.S. Pat. No. 5,521,980 is used throughout; from now on it is referred to as "the basic proof of knowledge." This particular choice for proving knowledge of a representation is believed to be preferred in most applications. However, as will be clear to those of ordinary skill in the art, the inventive techniques can be implemented based on any other proof of knowledge of a representation that has the well-known characteristics of being complete and sound, and that is (believed to be) witness hiding; some such alternatives may be simple variations, perhaps arrived at by interchanging some or all of the exponents (such as the position of the challenges and the responses) in the verification relation for the verifier party, while others may depend on entirely different approaches.

It is well-known in the art that one can rapidly evaluate a product of powers, such as $g_1^{x_1} \cdots g_k^{x_k}$, by simultaneous repeated squaring. For efficiency it is preferable that, for all $2^k - 1$ non-empty subsets of $\{g_1, \ldots, g_k\}$, the product of the $g_i$'s in the subset is pre-computed and stored in a table. For example if k equals 14, and $g_i$'s are represented by 512-bit numbers, this table takes up almost one megabyte of storage space; well within reach of currently available personal computers (that can load the entire table into RAM). Regardless of the choice of k, the number of modular multiplications in $G_q$ needed to evaluate the product of powers then never needs to exceed twice the binary length of q. Also known in the art are ways to trade off between the storage space for the table and the number of required modular multiplications (for example by considering groups of exponent bits instead of single bits), and ways to further improve computational efficiency.

The choice of describing embodiments related to the difficulty of computing discrete logarithms is only intended to be suggestive, and not limiting in any way. The inventive techniques can also be implemented based on the (presumed) difficulty of computing so-called RSA-roots. Hereto a set of secrets, $(x_1, \ldots, x_k)$, consists of numbers in the ring $\mathbb{Z}_v$, where v is a large prime number. Computations are performed in a group $\mathbb{Z}^*_n$, where n is the product of (at least) two large distinct primes that have been generated at random and are unknown at least to P, and $k \geq 1$ numbers, $Y_1, \ldots, Y_k$, all in $\mathbb{Z}^*_n$ and preferably of large order, are decided on. As in U.S. patent application Ser. No. 08/203,231, a vector $(x_1, \ldots, x_k, x_{k+1})$, with $x_1, \ldots, x_k \in \mathbb{Z}_v$ and $x_{n+1} \in \mathbb{Z}^*_n$, is called a representation of a number h in $\mathbb{Z}^*_n$, with respect to $(Y_1, \ldots, Y_k, v)$, if h is equal to $\pi_{i=1}^{k} Y_i^{x_i} x_{k+1}^{v}$ mod n. The choice of n and $(Y_1, \ldots, Y_k, v)$ must be such that it is believed infeasible for at least P to compute a representation of 1, with respect to $(Y_1, \ldots, Y_k, v)$, that differs from the "trivial" representation $(0, \ldots, 0, 1)$. This requirement is easy to meet: a party that knows the factorization of n can easily generate at random numbers of order $\lambda(n)$ (the highest possible order in $\mathbb{Z}^*_n$). Alternatively, if n is the product of two hard primes, well-known in the art, then a random choice in $\mathbb{Z}^*_n$ has high order with overwhelming probability. Of course, any other suitable method may be used as well. To demonstrate knowledge of a representation without revealing (useful) information about it, the basic proof of knowledge described by FIG. 5 of U.S. Pat. No. 5,521,980 can be used. Each detailed description of a figure is followed by a description of how to embody the inventive technique based on the difficulty of computing RSA roots. The descriptions for the RSA case detail only the changes that need to be made to the Discrete Log-based protocols, rather then spelling out the entire RSA-based protocols; those of ordinary skill in the art are believed to be able to straightforwardly do so themselves, by studying the provided descriptions.

Turning now to FIG. 1, a flowchart of a first protocol for demonstrating that a system of linear relations applies to a set of secrets, without revealing additional information about the secrets, will now be described in detail.

At the outset, P knows a representation $(x_1, \ldots, x_k)$ of a number h in $G_q$ with respect to $(g_1, \ldots, g_k)$; this representation is its set of secrets. The number, h, is a commitment of P on its set of secrets. Without loss of generality, it is assumed that P has to demonstrate to v that its secrets satisfy the following $l \geq 1$ independent linear relations:

$$b_1 = \alpha_{11} x_{\pi(1)} + \ldots + \alpha_{1,k-l} x_{\pi(k-l)} + x_{\pi(k-l+1)} \bmod q$$

$$b_2 = \alpha_{21} x_{\pi(1)} + \ldots + \alpha_{2,k-l} x_{\pi(k-l)} + x_{\pi(k-l+2)} \bmod q$$

$$b_l = \alpha_{l1} x_{\pi(1)} + \ldots + \alpha_{l,k-l} x_{\pi(k-l)} + x_{\pi(k)} \bmod q,$$

or, in matrix form, $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 \\ \vdots \\ \vdots \\ b_l \end{pmatrix} \bmod q.$$

For further reference, the formula that is specified by this system of linear relations is denoted by F. The numbers $\alpha_{ij}$, for $1 \leq i \leq l$ and $1 \leq j \leq k-l$, and the numbers $b_i$, for $1 \leq i \leq l$, are elements of $\mathbb{Z}_q$, and $\pi(\cdot)$ is a permutation of $\{1, \ldots, k\}$. It will be clear to those of ordinary skill in the art that any system of linear relations in $x_1, \ldots, x_k$ can be described in this form. Namely, if a system of linear relations contains dependent relations, it can be reduced to a system of independent linear relations, denoted in number by l here: then the matrix of coefficients can be brought into so-called row canonical form (also known as row echelon form); and finally, by applying a suitable permutation $\pi(\cdot)$, the columns of the matrix of coefficients can be interchanged, arriving at the system displayed above.

Clearly, any predetermined arrangement of the numbers $\alpha_{ij}$, for $1 \leq i \leq l$ and $1 \leq j \leq k-l$, and the numbers $b_i$, for $1 \leq i \leq l$, can be used to describe the formula F, possibly in combination with additional bits that specify that F is a formula consisting of a system of linear relations (i.e., F has only "AND" connectives). Of course, how much additional bits are needed to specify F depends on the set of formulas from which P is allowed to pick an F for demonstration.

The inventive technique consists of P demonstrating that it knows a representation of the number, $h(\Pi_{i=1}^{l} g_{\pi(k-l+i)}^{b_i})^{-1}$, with respect to $$\left( g_{\pi(1)} \prod_{i=1}^{l} g_{\pi(k-l+i)}^{-\alpha_{i,1}}, \ldots, g_{\pi(k-l)} \prod_{i=1}^{l} g_{\pi(k-l+i)}^{-\alpha_{i,k-l}} \right).$$

P indeed knows such a representation in case the system of linear relations holds, namely $(x_{\pi(1)}, \ldots, x_{\pi(k-l)})$. By applying the basic proof of knowledge, and expanding the resulting expressions, P and v can evaluate all products of powers in the proof by evaluating products of powers of the numbers in the set $\{h, g_1, \ldots, g_k\}$. P and v can hence efficiently apply, say, the simultaneous repeated squaring technique, by making use of one pre-computed table whose $2^{k+1}-1$ entries consist of the products of the numbers in the non-empty subsets of $\{h, g_1, \ldots, g_k\}$. The protocol steps are as follows.

Box 11 first shows P generating $k-l$ random numbers, $w_1, \ldots, w_{k-l}$, all in $\mathbb{Z}_q$. The second line shows P computing a number a in $G_q$, in such a manner that P knows a randomly generated representation of a with respect to $$\left( g_{\pi(1)} \prod_{i=1}^{l} g_{\pi(k-l+i)}^{-\alpha_{i,1}}, \ldots, g_{\pi(k-l)} \prod_{i=1}^{l} g_{\pi(k-l+i)}^{-\alpha_{i,k-l}} \right),$$

namely, $(w_1, \ldots, w_{k-l})$. The number a may be called an initial witness, in line with terminology commonly used in the art for three-move proofs of knowledge. The third line shows P sending h, a digital certificate (denoted by cert(h)) of a certification authority on h, and a to v. The certificate may also be on such information as an identity description of P and an expiration date, but such information is not explicitly shown because it is unrelated to the inventive technique. Alternatively, depending on the application, v may be able to retrieve h and the certificate from a public-key directory or the like, or a certificate is not needed at all because v can check the validity of h in another way. In any case, it will be clear that if the protocol is to be repeated several times, h and the certificate need only be sent at most once to v.

The first line of Box 12 shows v generating a challenge number c in $\mathbb{Z}_{2^c}$, and the second line shows v sending c to P. There are several fundamentally different manners in which c can be chosen, each of which makes an important distinction for the inventive method: depending on the manner in which c is generated, the protocol is zero-knowledge, witness hiding or a signed proof (the latter can come in many flavors). This is described in detail shortly, after the description of Box 13 and Box 14.

The first three lines of Box 13 show P computing k−1 response numbers, all in $\mathbb{Z}_q$, and denoted by $r_1, \ldots, r_{k-l}$. The fourth line shows P sending the k−1 response numbers to v.

The first three lines of Box 14 show v computing l numbers, $r_{k-l+1}, \ldots, r_k$. The fourth line shows v verifying the k−l responses provided by P. If the verification holds, then v accepts the proof. If v accepts then the probability that P has been cheating successfully is $\frac{1}{2}^t$ for truly random c, and should be close to it when c is computed as a one-way hash of at least a.

If one represents atomic propositions by linear relations over $\mathbb{Z}_q$, then the inventive technique of FIG. 1 can be used to demonstrate any satisfiable formula from so-called propositional logic that has only "AND" logical connectives. An example follows.

EXAMPLE 1

To demonstrate the formula "$(x_1 = 2x_3 + 3x_4 + 5 \bmod q)$ AND $(x_2 = 6x_4 - 7 \bmod q)$," for a situation with k=5, P proves to v knowledge of a representation of $h/(g_1^5 g_2^{-7})$ with respect to $(g_1^2 g_3, g_1^3 g_2^6 g_4, g_5)$. P hereto computes a as $g_1^{2w_1+3w_2} g_2^{6w_2} g_3^{w_1} g_4^{w_2} g_5^{w_3}$, for random $w_1$, $w_2$ and $w_3$ in $\mathbb{Z}_q$, and provides responses $r_1 \leftarrow cx_3 + w_1 \bmod q$, $r_2 \leftarrow cx_4 + w_2 \bmod q$ and $r_3 \leftarrow cx_5 + w_3 \bmod q$, responsive to a challenge c. v verifies the responses by checking whether a equals $h^{-c} g_1^{5c+2r_1+3r_2} g_2^{-7c+6r_2} g_3^{r_1} g_4^{r_2} g_5^{r_3}$. [End of example 1]

Returning to the description of Box 12, the first manner in which c can be determined is for v to choose it from a small set (i.e., t must be small). The four protocol steps must then be repeated several times, in order for v to be convinced that P knows a set of secrets (a representation) of h, and that the formula F applies to the secrets of P. This results in a zero-knowledge demonstration.

The second manner is to chose c at random from a large set (i.e., t is large). In this case no repetition of the protocol steps is needed to convince v with high probability. Although the protocol is believed not to be zero-knowledge, it is believed to be infeasible for v to learn additional information about the secrets of P. (Indeed, in case k is at least l+2, which can always be ensured by P by extending its set of secrets with an additional "dummy" secret, the protocol can be proved to be witness hiding.) Alternatively, the protocol can be made zero-knowledge by having v start the protocol, by sending to P a commitment on its challenge c; v must then open the commitment in Box 12 (this ensures that v cannot compute c depending on the information provided by P in box 11). An example of a suitable commitment is $g_i^c h^s$, for a random s in $\mathbb{Z}_q$ and a generators $g_i$ from the set of generators used by P and v.

Thirdly, the demonstration can be performed as a signed proof, meaning that v can subsequently demonstrate to other parties that it has performed the protocol with P, by showing the transcript of the protocol execution. In this case the challenge c must be computed as a hash (implying that t is large) of certain information; the hash-function should preferably be collision-intractable, and to prevent combining of old signed proofs into new ones several algebraic relations in terms of the hashfunction should be infeasible to compute. The information that is hashed in order to compute c should comprise at least a. Furthermore some or all of the following may be hashed along: h; a digital certificate on h (in particular that shown in the third line of Box 11; in case h can be verified in another way to correspond to P, the certificate may be omitted); a message for v (the signed proof then serves as a digital signature of P on that message); additional information such as an expiration date; and, a description of the formula F that is demonstrated by P. The following information suffices to constitute the signed proof: h, ($r_1, \ldots, r_{k-l}$), c, and any (other) information hashed in order to compute c, with the possible exception of a (it suffices to include only one of c and a; the former results in a more compact signed proof).

Whether a description of F is hashed along or not has important implications for what exactly the signed proof demonstrates. Namely, if a description of F is hashed along, then the transcript of the protocol execution subsequently can be used to convince others that P knows a set of secrets corresponding to h, and that the formula F applies to the secrets of P. If, on the other hand, F is not hashed along, then in general the transcript of the protocol execution only demonstrates that P knows a set of secrets corresponding to h, it is not a convincing demonstration of the fact that the formula F applies to the secrets of P. However, if P is not allowed to demonstrate any system of linear relations for its secrets, but only systems of linear relations for which at least some of the coefficients $\alpha_{ij}$ must be in a predetermined negligible subset of $\mathbb{Z}_q$, then it may not be necessary to hash along the entire description of F: it may suffice to hash along only a part of the description of F (such as some of the $\alpha_{ij}$'s, or a description of linear relations that apply to the $\alpha_{ij}$'s, or more generally some information about F), or perhaps no information about F at all, in order for the signed proof to convince others of the fact that P knows a set of secrets corresponding to h, and that the formula F applies to the secrets of P. Or, when only some of the coefficients $\alpha_{ij}$ and/or $b_i$ are hashed along in the computation of c, or more generally only some information about the coefficients $\alpha_{ij}$ and/or $b_i$ (in other words, a partial description of F), the signed proof may be convincing that one out of a restricted set of formulas applies to the set of secrets of P, without revealing which one. From the above description it is believed to be clear to those of ordinary skill in the art how these various forms of signed proofs can be constructed, and that different forms of signed proof may each have their own merits, depending on the application in which a signed proof is to be used.

As a simple example, consider $h = g_1^{x_1} g_2^{x_2}$, and suppose that P has to demonstrate a formula F taken from the formulas described by relations $x_2 = A \bmod q$, for $A \in \mathbb{Z}_q$. It hereto provides a response r such that $a = h^{-c} g_1^r g_2^{Ac}$. If c is a hash of h and a only, then the signed proof (consisting of h, c, A and r) does not demonstrate that $x_2 = A \bmod q$; it merely shows that P knows a representation of h with respect to $(g_1, g_2)$. Namely, P and v could have taken $a \leftarrow g_1^{w_1} g_2^{w_2}$, for random $w_1$ and $w_2$, and $A \leftarrow x_2 + w_2/c \bmod q$. However, A is not under control of P and v in this case (assuming the hashfunction is sufficiently secure), and so the signed proof does demonstrate that $x_2 = A \bmod q$ in the special case that A must be in a subset of $\mathbb{Z}_q$ that is negligible (which is for example the case if A may only be zero or one). By hashing not only h and a, but also a description of F (if A parameterizes all possible formulas F, then A can be used to describe F), it is ensured that the signed proof also shows that F applies to the secrets of P, no matter whether or not a restriction is imposed on the set of formulas that may be demonstrated.

It will also be clear to those of ordinary skill in the art that P may be able to compute c by itself in case of a signed proof (and it then does not need to supply a to v); this depends on whether the additional information to be included in the hashvalue is available to P, and on whether P is allowed to know c. Namely, if v provides P with the information that it wants to be hashed along in the computation of c, then P can compute c by itself; in particular, if P can determine by itself all the information that needs to be hashed, no interaction with v is needed. If, on the other hand, v wants to hash along a message that must remain unknown to P, or v wants to blind the signed proof, then v should compute c by itself.

In order to completely blind the signed proof, v can compute c in Box 12 as follows: it generates random k−l+1 blinding factors $\gamma_0, \ldots, \gamma_{k-l}$; it uses these to compute a blinded form, a', of a, according to $$a' \leftarrow \left(a\left(\left(h\left(\prod_{i=1}^{l} g_{\pi(k-l+i)}^{b_i}\right)\right)^{-1}\right)^{\gamma_0} \prod_{i=1}^{k-l} g_i^{\gamma_i}\right);$$

it computes a number c' by hashing in any one of the manners described above for obtaining a signed proof, only this time hashing along a' instead of a; and, it computes the challenge c according to $c \leftarrow c'+\gamma_0 \bmod q$. In Box 14, v computes blinded forms of $r'_1, \ldots, r'_{k-l}$ of $r_1, \ldots, r_{k-l}$, according to $$r'_i \leftarrow r_i + \gamma_i \bmod q,$$

for all $1 \leq i \leq k-l$. The signed proof is then formed by: h, $(r'_1, \ldots, r'_{k-l})$, c', and any information hashed in order to compute c', with the possible exception of a' (it suffices to include only one of c' and a'; the former results in a more compact signed proof). It will also be clear to those of ordinary skill in the art how v must compute c, and adjust the responses of P in Box 13, in order to obtain a restrictively blinded signed proof: hereto the inventive techniques for restrictive blinding, detailed in U.S. Pat. No. 5,321,980 and in U.S. patent application Ser. No. 08/321,855, filed Oct. 14, 1994, both by the present applicant, can be combined straightforwardly with the inventive technique of FIG. 1.

Furthermore, the protocol for demonstrating F can be made non-transferable, meaning that v cannot in real-time divert the protocol execution to another party in order to convince that party (as is well-known, zero-knowledge does not suffice to prevent this so-called man-in-the-middle attack). Hereto the inventive technique can be combined with a technique known in the art (See, Jakobsson. M., Sako, K. and Impagliazzo, R., "Designated verifier proofs and their applications," Advances in Cryptology— EUROCRYPT '96, Lecture Notes in Computer Science, Springer-Verlag, 1996). In effect, P must prove either that F applies to its own representation of h, or that it knows a representation of a number in $G_q$ that is associated with v. For this it must prove that it knows a secret key (representation) of h $(\Pi_{i=1}^{l} g_{\pi(k-l+i)}^{b_i})^{-1}$ with respect to $$\left(g_{\pi(1)} \prod_{i=1}^{l} g_{\pi(k-l+i)}^{-\alpha_{i,1}}, \ldots, g_{\pi(k-l)} \prod_{i=1}^{l} g_{\pi(k-l+i)}^{-\alpha_{i,k-l}}\right).$$

(as detailed already above), or that it knows a secret key of a public key of v. To accomplish this, another technique known in the art can be used (See, Cramer, R., Damgard, I., and Schoenmakers, B., "Proofs of Partial Knowledge and Simplified Design of Witness Hiding Protocols," Advance in Cryptology—CRYPTO '94, Lecture Notes in Computer Science, Springer-Verlag, 1995); this technique enables P to demonstrate that it knows a secret key of a first public key or a secret key of a second public key.

Using techniques described in U.S. Pat. No. 5,521,980, P can consist of two (or more) parties, not necessarily acting in the same interest. A typical example is for P to be computer equipment held by a person, with P consisting of a tamper-resistant computing device T (typically a smart card or the like) acting in the interest of an issuer of T, and a user-controlled personal computer U acting in the interest of the person, and T and U configured such that all flow of information to and from T must pass through U. By ensuring that part of the representation $(x_1, \ldots, x_k)$ of h is known only to T, which has been programmed on behalf of its issuer or some other party, the demonstration in general can only be performed when T cooperates. It hereto suffices that U knows all but one of the exponents, say $x_k$, which is known only to T; $g_k^{x_k}$ can be viewed as a public key of T, and $x_k$ as its secret key. When the linear relations do not involve $x_k$, the proof can be performed in such a way that $x_k$ is not revealed by T.

To illustrate this. consider again example 1. In this case, T knows $x_5$ and U knows $(x_1, \ldots, x_4)$. T should generate $w_3$ and provide U with $a_1 \leftarrow g_5^{w_3}$, and U should generate $w_1$ and $w_2$ and multiply $a_1$ by $g_1^{2w_1+3w_2} g_2^{6w_2} g_3^{w_1} g_4^{w_2}$ to obtain a; U can then compute $r_1$ and $r_2$, while T has to provide $r_3$.

As detailed in U.S. Pat. No. 5,521,980, U can furthermore prevent subliminal channels from T to v and vice versa, and in fact even the development of random numbers known to both T and v. In example 1, U can hereto add a random number t in $\mathbb{Z}_q$ to the challenge, c, before passing it on to T (to prevent inflow), and add a random number u in $\mathbb{Z}_q$ to $r_3$ before passing it on to v (to prevent outflow); correspondingly, U can then multiply a in addition by $g_5^u (g_5^{x_5})^t$, before passing it to v.

It will be clear to those of ordinary skill in the art that the above manners of computing c in Box 12, the techniques for blinding and restrictive blinding, the technique for making the demonstration protocol non-transferable, and the technique for dividing P into parties with conflicting interests, apply equally well to the other inventive methods that will be described hereafter. For this reason in later descriptions only a reference to these techniques will be provided (whenever appropriate).

The inventive technique of FIG. 1 can also be based on the difficulty of computing RSA-roots. Consider P having to prove the same system of linear relations, but then with all equations modulo v instead of modulo q, and having committed to a set of secrets $(x_1, \ldots, x_k)$ by using $h \leftarrow Y_1^{x_1} \cdots Y_k^{x_k} x_{k+1}^u \bmod n$ for a number $x_{k+1}$ in $\mathbb{Z}^*_n$. (Depending on the application, $x_{k+1}$ may, or may not have been chosen secret and at random; in the latter case it can be taken equal to 1, for computational efficiency.) The inventive technique then consists of letting P demonstrate that it knows a representation of the number, h $(\Pi_{i=1}^{l} Y_{\pi(k+l+i)}^{b_i})^{-1} \bmod n$, with respect to $$\left(Y_{\pi(1)} \prod_{i=1}^{l} Y_{\pi(k-l+i)}^{-\alpha_{i,1}} \bmod n, \ldots, Y_{\pi(k-l)} \prod_{i=1}^{l} Y_{\pi(k-l+i)}^{-\alpha_{i,k-l}} \bmod n, v\right).$$

Figure 5:
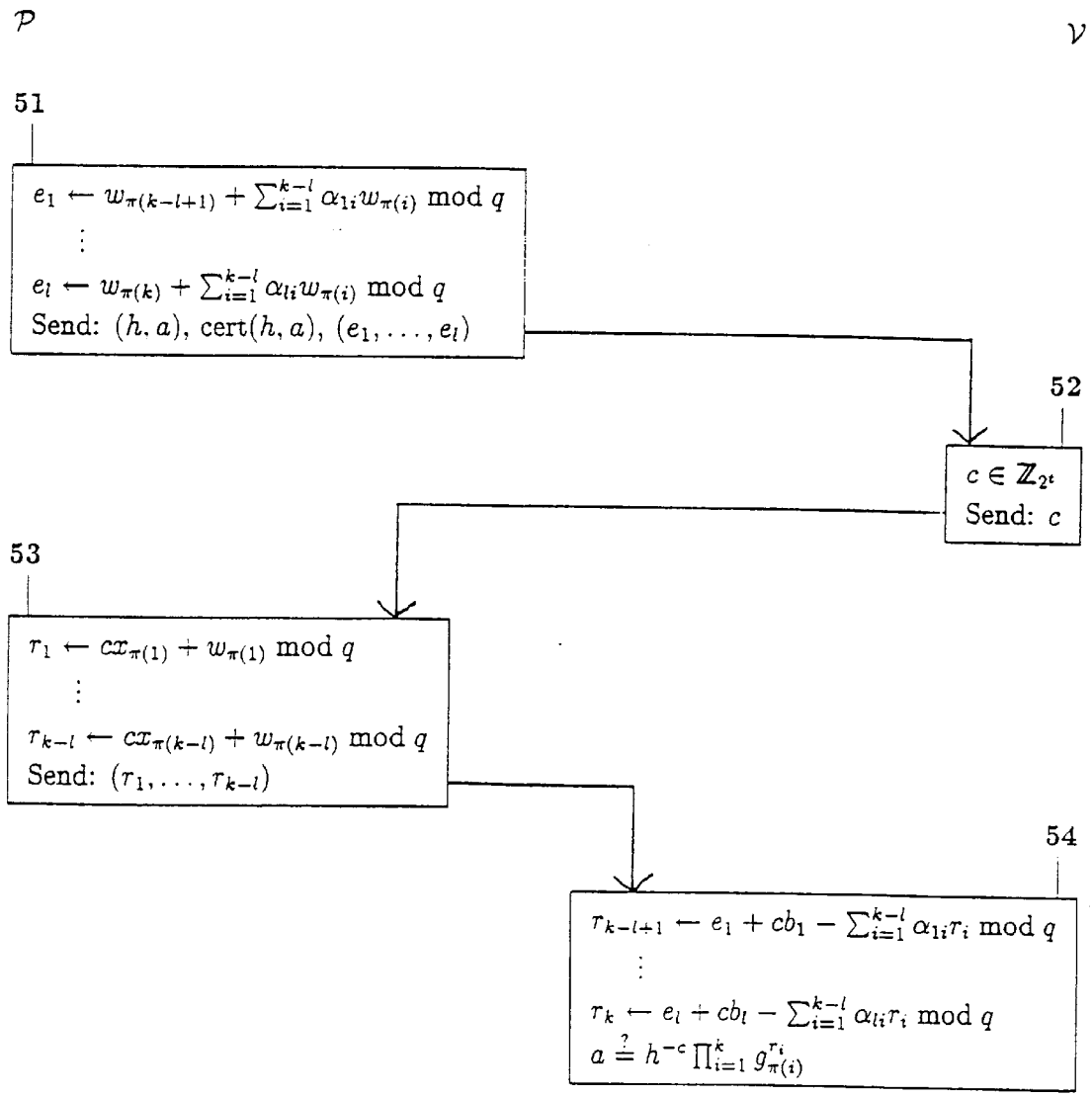
FIG. 5 shows a flowchart of a protocol for demonstrating that a system of linear relations pertains to a set of secrets, revealing additional information about the secrets if and only if performed more than once, in accordance with the teachings of the present invention.

By using the basic proof of knowledge described by FIG. 5 of U.S. Pat. No. 5,521,980, expanding the resulting expressions, a single pre-computed table can be used for efficient simultaneous repeated squaring. A detailed description is omitted here, since those of ordinary skill in the art are believed to be capable of straightforwardly applying the inventive method of FIG. 1 by studying the drawing in conjunction with the corresponding description. Likewise, it is believed to be straightforward for those of ordinary skill in the art to apply the techniques described above for computing the challenge, for blinding and restrictive blinding, for making the demonstration protocol non-transferable, and for dividing P into parties with conflicting interests.

Figure 2:
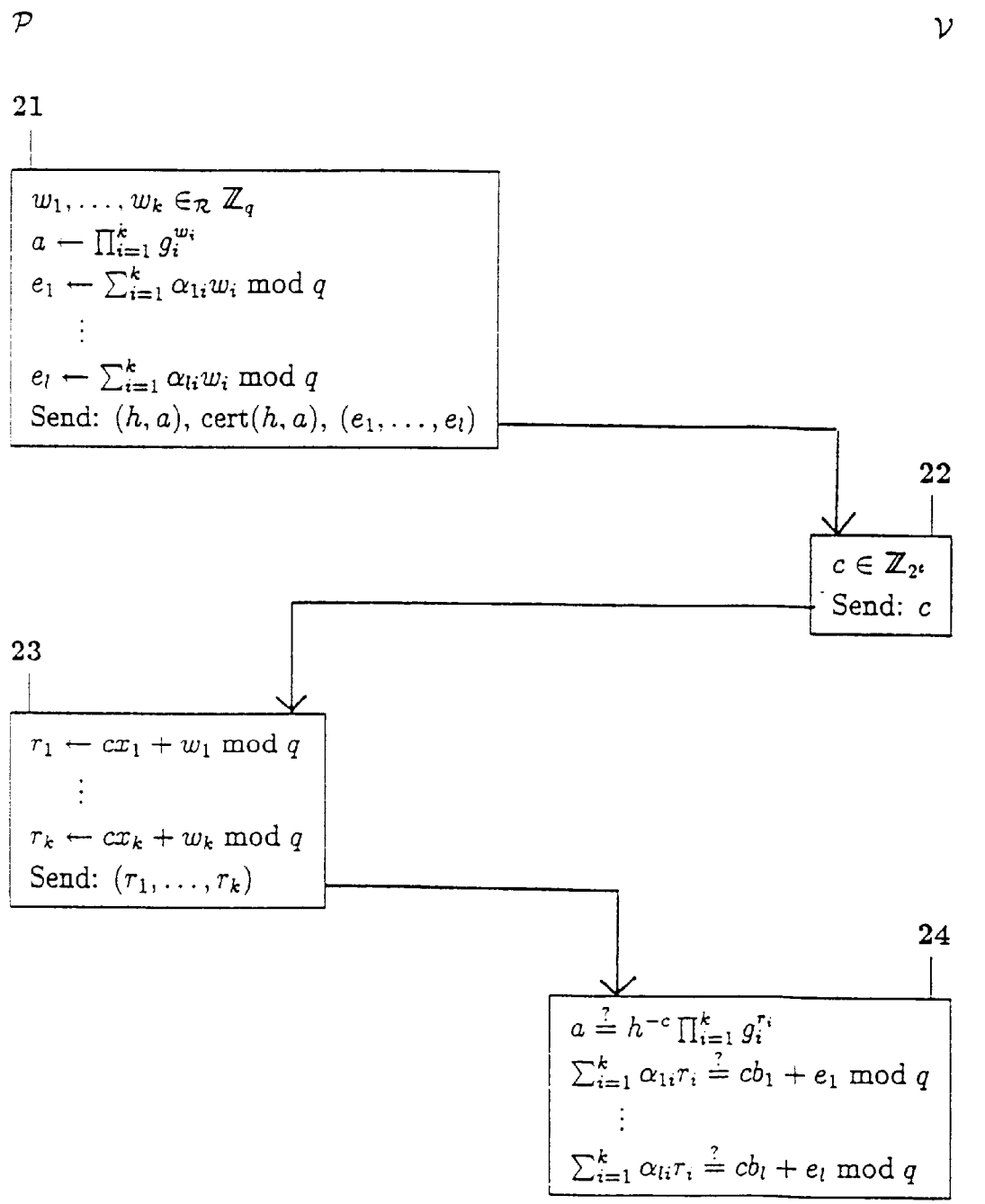
FIG. 2 shows a flowchart of a second protocol for demonstrating that a system of linear relations pertains to a set of secrets, without revealing additional information about the secrets, in accordance with the teachings of present invention.

Turning now to FIG. 2, a flowchart of a second protocol for demonstrating that a system of linear relations applies to a set of secrets, without revealing additional information about the secrets, will now be described in detail.

As in FIG. 1. at the outset P knows a representation $(x_1, \ldots, x_k)$ of a number h in $G_q$ with respect to $(g_1, \ldots, g_k)$. P has to demonstrate a system consisting of l independent linear relations, $$\begin{pmatrix} \alpha_{11} & \cdots & \alpha_{1k} \\ \vdots & & \vdots \\ \alpha_{l1} & \cdots & \alpha_{lk} \end{pmatrix} \begin{pmatrix} x_{\pi(1)} \\ \vdots \\ x_{\pi(k)} \end{pmatrix} = \begin{pmatrix} b_1 \\ \vdots \\ b_l \end{pmatrix} \bmod q.$$

Contrary to the method of FIG. 1, the matrix of coefficients $\alpha_{ij}$, for $1 \leq i \leq l$ and $1 \leq j \leq k$, does not need to be in row canonical form. The protocol steps for demonstrating this formula F are as follows.

Box 21 first shows P generating k random numbers, $w_1, \ldots, w_k$, all in $\mathbb{Z}_q$. The second line shows P computing a number a in $G_q$, in such a manner that $(w_1, \ldots, w_k)$ is a representation of a with respect to $(g_1, \ldots, g_k)$. The number a may be called an initial witness. The next three lines show P computing l numbers, $e_1, \ldots, e_l$ all in $\mathbb{Z}_q$, in accordance with the system of linear relations. The sixth line shows P sending h, a digital certificate on h, and a to v; the remarks made for Box 11 apply here also.

The first line of Box 22 shows v generating a challenge number c in $\mathbb{Z}_{2^t}$, and the second line shows v sending c to P.

The first three lines of Box 23 show P computing k response numbers, all in $\mathbb{Z}_q$, and denoted by $r_1, \ldots, r_k$. The fourth line shows P sending the k response numbers to v.

The first four lines of Box 24 show v verifying the k responses, $r_1, \ldots, r_k$, by checking l+1 verification relations. If all verifications hold, then v accepts.

Compared to the method of FIG. 1 this method requires more information to be transmitted from P to v. On the other hand, an advantage is that the computation of a does not depend on the particular system of linear relations that is to be demonstrated. Hence P can compute a in advance, before knowing the system of relations that is to demonstrated; only the computation of $e_1, \ldots, e_l$ is dependent of the particular system to be demonstrated, but the required computation time for this is negligible in comparison to that for a.

As will be clear to those of ordinary skill in the art, all the techniques described in relation to FIG. 1 also apply to the inventive technique of FIG. 2. Moreover, in case of a signed proof, the issue of whether a description of F must be hashed along or not when computing c, or whether perhaps only some information about F needs to be hashed along, now also applies to $(e_1, \ldots, e_l)$. For example, if P is allowed to demonstrate any formula F, and the signed proof should convince that F applies to the secrets of P, then a description of F as well as $(e_1, \ldots, e_l)$ should be hashed along. If it is sufficient that the signed proof only convinces that some formula out of a subset of all formulas applies to the secrets of P, then only some information about F and/or some information about $(e_1, \ldots, e_l)$ needs to be hashed along (with the choice of which information depending on the particular subset of formulas that is considered). If no information about $(e_1, \ldots, e_l)$ is hashed along, then the signed proof only demonstrates that P knows a representation of h with respect to $(g_1, \ldots, g_k)$, even in case P is allowed to demonstrate only a few formulas.

Variations of the inventive method of FIG. 2 are possible. For example, the inventive method of FIG. 5, described later on, is also an adaptation of the method of FIG. 1. It has the same advantage as FIG. 2, while having somewhat greater communication efficiency. (The inventive technique of FIG. 5 serves an additional goal, namely to prevent P from performing the demonstration more than once, but this extra feature is not of relevance here; for the present discussion, P in FIG. 5 could just as well be allowed to choose a freely each time the proof with respect to h is performed.) The following changes to Box 23 and Box 24 ensure that the method of FIG. 2 becomes equally efficient to that of FIG. 5: in Box 23, P only computes k-l of the response numbers, and sends these to v (the k-l positions must be agreed upon with v in advance); instead of verifying the linear relations as specified in the last three lines of Box 24, v computes the remaining l response numbers in accordance with these l relations; and finally, v verifies the response numbers, k in total, as specified by the first line of Box 24.

More generally, v can restrict the set of formulas that P will be able to perform to a subclass, by requiring the numbers $(e_1, \ldots, e_l)$ sent by P in Box 21 to satisfy certain restrictions. Namely, the numbers $(e_1, \ldots, e_l)$ can be thought of as correction factors for adjusting a, in order to ensure that the adjusted form of a can be used to demonstrate a particular formula. By allowing P in Box 21 to send only up to z correction factors, where z<l, and/or by allowing P to send only correction factors that satisfy a system of (linear or otherwise) relations, P's computation of a will be able to anticipate only a subset of possible formulas. The protocol of FIG. 1 can be thought of as the extreme case where v does not allow P to use any correction factors: P hence must compute a in direct correspondence to the formula F.

It will be clear to those of ordinary skill in the art how to base the inventive technique of FIG. 2, as well as all other described variations and related techniques, on the difficulty of computing RSA-roots; for this reason a detailed description is omitted.

Figure 3:
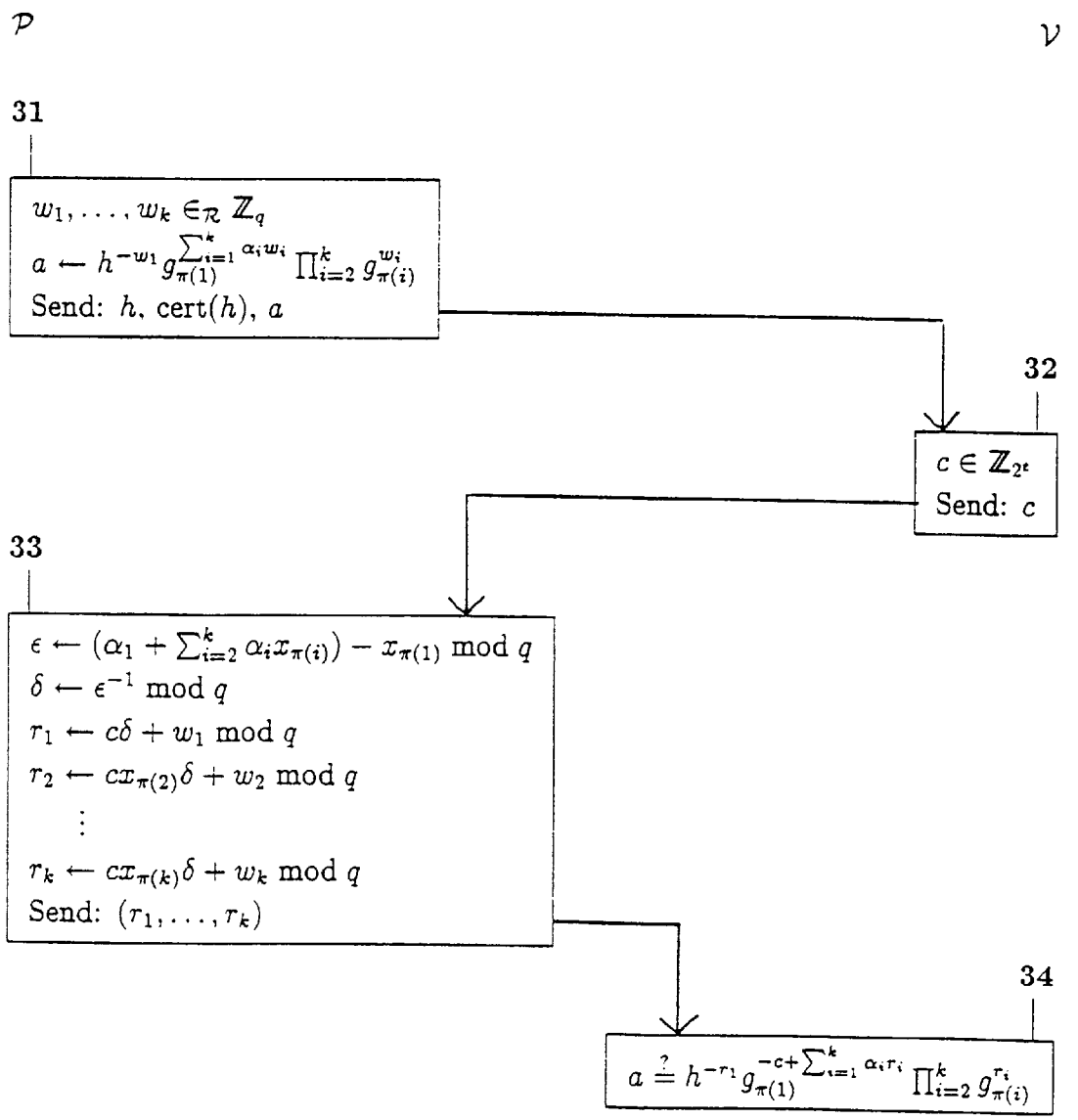
FIG. 3 shows a flowchart of a protocol for demonstrating that a linear relation does not hold for a set of secrets, without revealing additional information about the secrets, in accordance with the teachings of the present invention.

Turning now to FIG. 3, a flowchart of a protocol for demonstrating that a linear relation does not apply to a set of secrets, without revealing additional information about the secrets, will now be described in detail.

The situation at the outset is as described for FIG. 1. P has to demonstrate to v that its set of secrets (the representation it knows of h) satisfies the formula $x_{\pi(1)} \neq \alpha_1 + \alpha_2 x_{\pi(2)} \cdots + \alpha_k x_{\pi(k)} \bmod q$. The coefficients $\alpha_i$, for $1 \leq i \leq k$, are elements of $\mathbb{Z}_q$, and they form a description of the formula F that P has to demonstrate (again, depending on the space of all formulas that may be demonstrated by P, additional bits may be needed to describe F). As will be apparent to those of ordinary skill in the art, any linear inequality can be written in this form, for a suitable permutation, $\pi(\cdot)$, of $\{1, \ldots, k\}$. Moreover $\pi(\cdot)$ can always be defined to interchange at most two elements and leave the rest unchanged.

If inequality holds, then $x_{\pi(1)}$ is equal to $(\alpha_1 + \alpha_2 x_{\pi(2)} + \cdots + \alpha_k x_{\pi(k)}) - \epsilon \bmod q$, for a nonzero $\epsilon$ in $\mathbb{Z}_q$. The inventive technique consists of P demonstrating that it knows a representation of the number, $g_{90\ (1)}$, with respect to $$(g_{\pi(1)}^{\alpha_1} h^{31\ 1}, g_{\pi(1)}^{\alpha_2} g_{\pi(2)}, \ldots, g_{\pi(1)}^{\alpha_k} g_{\pi(k)}).$$

P indeed knows such a representation in case the inequality holds, namely ($\delta \bmod q$, $x_{\pi(2)} \delta \bmod q$, ..., $x_{\pi(k)} \delta \bmod q$), where $\delta$ denotes $\epsilon^{-1} \bmod q$. Applying the basic proof of knowledge, and expanding the resulting expressions into products of powers of numbers in the set $\{h, g_1, \ldots, g_k\}$, the following protocol results (again, any other proof of knowledge can be used instead).

Box 31 first shows P generating k random numbers, $w_1, \ldots, w_k$, all in $\mathbb{Z}_q$. The second line shows P computing a number a in $G_q$, in such a manner that P knows a randomly generated representation of a with respect to $$(g_{\pi(1)}{}^{\alpha_1}h^{-1}, g_{\pi(1)}{}^{\alpha_2}g_{\pi(2)}, \ldots, g_{\pi(1)}{}^{\alpha_k}g_{\pi(k)}),$$

namely, $(w_1, \ldots, w_k)$. The number a may be called an initial witness. The third line shows P sending h, a digital certificate on h, and a to v; the remarks made for Box 11 apply here also.

The first line of Box 32 shows v generating a challenge number c in $\mathbb{Z}_{2^t}$, and the second line shows v sending c to P.

Box 33 first shows P computing a difference number $\epsilon$, which is non-zero if the inequality holds. The second line shows P computing the inverse modulo q of $\epsilon$, denoted by $\delta$. The next four lines show P computing k response numbers, all in $\mathbb{Z}_q$, and denoted by $r_1, \ldots, r_k$. The seventh line shows P sending the k response numbers to v.

Box 34 shows v verifying the k responses, $r_1, \ldots, r_k$. If the verification holds, then v accepts the proof.

Representing atomic propositions by linear relations over $\mathbb{Z}_q$, this inventive technique can be used to demonstrate any satisfiable formula from propositional logic that has one "NOT" logical connective and no other logical connectives. The protocol described by FIG. 3 demonstrates to v the formula "NOT $(x_{\pi(1)}=\alpha_1+\alpha_2 x_{\pi(2)}+ \cdots +\alpha_k x_{\pi(k)} \mod q)$."

As will be clear to those of ordinary skill in the art, all the techniques described in relation to FIG. 1 also apply to the inventive technique of FIG. 3. Also, the technique of using correction factors, demonstrated by the inventive technique of FIG. 2, can be used, to ensure that P can compute a independent of the formula it has to demonstrate; and v can restrict the number of correction factors, and/or the relations they need to satisfy, in order to restrict the set of formulas that can be anticipated by P with the same a, as described for FIG. 2.

Moreover, to demonstrate that none of l independent linear relations holds, where l>1, P has to perform the protocol l times, once for each inequality. All l demonstrations can be performed in parallel, and can furthermore be responsive to the same challenge c. In the latter case, all the data of each individual demonstration must be hashed into c in order to obtain a signed proof. The various flavors of signed proofs, described in relation to FIG. 1, can also be obtained in this case, as will be clear to those of ordinary skill in the art.

Combination with the inventive technique of FIG. 1 allows P to demonstrate any satisfiable formulas from propositional logic that has both "AND" and "NOT" logical connectives, atomic propositions being linear relations over $\mathbb{Z}_q$. For a system consisting of one or more linear relations and one linear inequality, the inequality is first written as a linear relation by introducing a difference term (denotes by $\epsilon$ in the description above). By appropriate substitution, the system can then be represented by the following matrix relation $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 - f_1\epsilon \\ \vdots \\ \vdots \\ b_l - f_l\epsilon \end{pmatrix} \mod q,$$

where $f_1, \ldots, f_l$ are numbers in $\mathbb{Z}_q$. (Clearly $f_1$, say, can always be made equal to 1.) P then has to demonstrate knowledge of a representation of the number, $\Pi_{i=1}^{l} g_{\pi(k-l+i)}{}^{f_i}$, with respect to $$\left( h^{-1} \prod_{i=1}^{l} g_{\pi(k-l+i)}^{b_i}, g_{\pi(1)} \prod_{i=1}^{l} g_{\pi(k-l+i)}^{-\alpha_{i,1}}, \ldots, g_{\pi(k-l)} \prod_{i=1}^{l} g_{\pi(k-l+i)}^{-\alpha_{i,k-l}} \right).$$

P indeed knows such a representation in case the system holds, namely, $(\delta, x_{\pi(1)}\delta \mod q, \ldots, x_{\pi(k-l)}\delta \mod q)$, where $\delta$ denotes $\epsilon^{-1} \mod q$. An example, based on example 1 and augmented with one "NOT" relation, follows.

EXAMPLE 2

To demonstrate the formula "$(x_1=2x_3+3x_4+5 \mod q)$ AND $(x_2=6x_4-7 \mod q)$ AND (NOT $(x_3=4x_4+8 \mod q))$," for a situation with k=5, P needs to show that $x_1=2x_3+3x_4+5 \mod q$, $x_2=6x_4-7 \mod q$ and $x_3=4x_4+8-\epsilon \mod q$, for some $\epsilon$ that must be demonstrated to be non-zero. Substitution gives that P must prove that $x_1=11x_4+21-2\epsilon \mod q$, $x_2=6x_4-7 \mod q$ and $x_3=4x_4+8-\epsilon$. P can perform this proof, since (3 mod q, $x_4\delta \mod q$, $x_5\delta \mod q$) is a representation of $g_1{}^2 g_3$ with respect to $(h^{-1}g_1{}^{21}g_2{}^{-7}g_3{}^8, g_1{}^{11}g_2{}^6 g_3{}^4 g_4, g_5)$, where $\delta=\epsilon^{-1} \mod q$. More specifically, P computes a as $h^{-w_1}g_1{}^{21w_1+11w_2}g_2{}^{-7w_1+6w_2}g_3{}^{8w_1+30} g_4{}^{4w_2}g_5{}^{w_2}g_5{}^{w_3}$, for random $w_1$, $w_2$ and $w_3$ in $\mathbb{Z}_q$, and provides responses $r_1\leftarrow c\delta+w_1 \mod q$, $r_2\leftarrow c\delta x_4+w_2 \mod q$ and $r_3\leftarrow c\delta x_5+w_3 \mod q$ responsive to a challenge c. v verifies the responses by checking whether a is equal to $h^{-r_1}g_1{}^{-2c+21r_1+11r_2}g_2{}^{-7r_1+6r_2}g_3{}^{-c+8r_1+4r_2}g_4{}^{r_2}g_5{}^{r_3}$.

As with the inventive technique of FIG. 1. P can consist of U and T, with T knowing $x_5$ and U knowing $(x_1, x_2, x_3, x_4)$: in the computation of a, $w_3$ must then be generated by T, and $g_5{}^{w_3}$ must be provided to U by T so that U can compute a. To prevent T from learning $\epsilon$. P can additionally raise $g_5{}^{w_3}$ to the power $\delta$ before multiplying it with $h^{-w_1}g_1{}^{21w_1+11w_2}g_2{}^{-7w_1+6w_2}g_3{}^{8w_1+4w_2}g_4{}^{w_2}$; when computing the responses, T then provides U with $r_3=cx_5+w_3 \mod q$, which U multiplies by $\delta$ before passing it on to v. More generally, to prevent inflow P can add a random number t in $\mathbb{Z}_q$ to the challenge c of v before passing it on to T, and to prevent outflow T can add a number u in $\mathbb{Z}_q$ to $r_3$ before multiplying it by $\delta$ and passing it on to v; correspondingly, the contribution $g_5{}^{w_2}$ of T in the computation of a can then be transformed by U to $g_5{}^{u\delta}(g_5{}^{x_5})^{t\delta}$ before multiplying it with $h^{-w_1}g_1{}^{21w_1+11w_2}g_2{}^{-7w_1+6w_2}g_3{}^{8w_1+4w_2}g_4{}^{w_2}$ to obtain a. [End of example 2]

More generally, the inventive techniques of FIG. 1 and FIG. 3 allow P to demonstrate any satisfiable formula that consists of an arbitrary number of "AND" and "NOT" logical connectives. When more than one "NOT" logical connective is present, the demonstration can be divided into several sub-formula proofs, which may be performed in parallel and responsive to the same challenge. For example, to demonstrate the formula "$S_1$ AND $S_2$ AND $S_3$ AND $S_4$ AND (NOT $S_5$) AND (NOT $S_6$)," where $S_1, \ldots, S_6$ are linear relations such that the formula is satisfiable, two sub-formula proofs can be performed. The division can be done in many ways: P can demonstrate "$S_1$ AND $S_2$ AND $S_3$ AND $S_4$ AND (NOT $S_5$)" and "NOT $S_6$;" or it can demonstrate "$S_1$ AND $S_2$ AND (NOT $S_5$)" and "$S_3$ AND $S_4$ AND (NOT $S_6$);" and so on.

The inventive technique for demonstrating any satisfiable formula from propositional logic that has "AND" and "NOT" logical connectives can also be based on the difficulty of computing RSA-roots. Assume that P has to prove the same inequality as for FIG. 3, but then modulo v instead of modulo q, and has committed to $(x_1, \ldots, x_k)$ by using $h \leftarrow Y_1^{x_1} \cdots Y_k^{x_k} x_{k+1}^v \mod n$ for a number $x_{k+1}$ in $\mathbb{Z}^*_n$. The inventive technique for demonstrating one inequality then consists of letting P demonstrate that it knows a representation of the number, $Y_{\pi(1)}$, with respect to $$(Y_{\pi(1)}^{\alpha_1} h^{-1} \mod n, Y_{\pi(1)}^{\alpha_2} Y_{\pi(2)} \mod n, \ldots, Y_{\pi(1)}^{\alpha_k} Y_{\pi(k)} \mod n, v).$$

If the inequality holds, $\epsilon \neq 0 \mod v$ and P can compute numbers d and f in $\mathbb{Z}_v$ such that $\epsilon d = 1 + fv$, by using the well-known Extended Euclidean Algorithm: a satisfying representation known to P is $$\left(d, dx_{\pi(2)} \mod v, \ldots, dx_{\pi(k)} \mod v, x_{k+1}^d Y_{\pi(1)}^{-f} \prod_{i=2}^{k} (Y_{\pi(1)}^{\alpha_i} Y_{\pi(i)})^{(dx_{\pi(i)}) \operatorname{div} v} \mod n\right).$$

Here, a div v denotes the maximum number of times that v can be subtracted from a such that the remainder is positive, that is, $a = v(a \operatorname{div} v) + a \mod v$. As will be clear to those of ordinary skill in the art, to demonstrate the system $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 - f_1 \epsilon \\ \vdots \\ \vdots \\ b_l - f_l \epsilon \end{pmatrix} \mod v,$$

where $f_1, \ldots, f_l$ are numbers in $\mathbb{Z}_v$, P can demonstrate knowledge of a representation of the number, $\prod_{i=1}^{l} Y_{\pi(k-l+i)}^{f_i}$, with respect to $$\left(h^{-1} \prod_{i=1}^{l} Y_{\pi(k-l+i)}^{b_i}, Y_{\pi(1)} \prod_{i=1}^{l} Y_{\pi(k-l+i)}^{-\alpha_{i1}}, \ldots, Y_{\pi(k-l)} \prod_{i=1}^{l} Y_{\pi(k-l+i)}^{-\alpha_{i,k-l}}, v\right).$$

P indeed knows such a representation in case the system holds, namely $(\delta, x_{\pi(1)} \delta \mod v, \ldots, x_{\pi(k-l)} \delta \mod v, x_{k+1})$, here $\delta$ denotes $\epsilon^{-1} \mod v$. Adaptation to proving general satisfiable formulas with "AND" and "NOT" logical connectives is believed to be straightforward for those of ordinary skill in the art when studying the described method for the discrete log-based approach, and hence is omitted here; the same holds for all other previously detailed techniques and variations.

Figure 4:
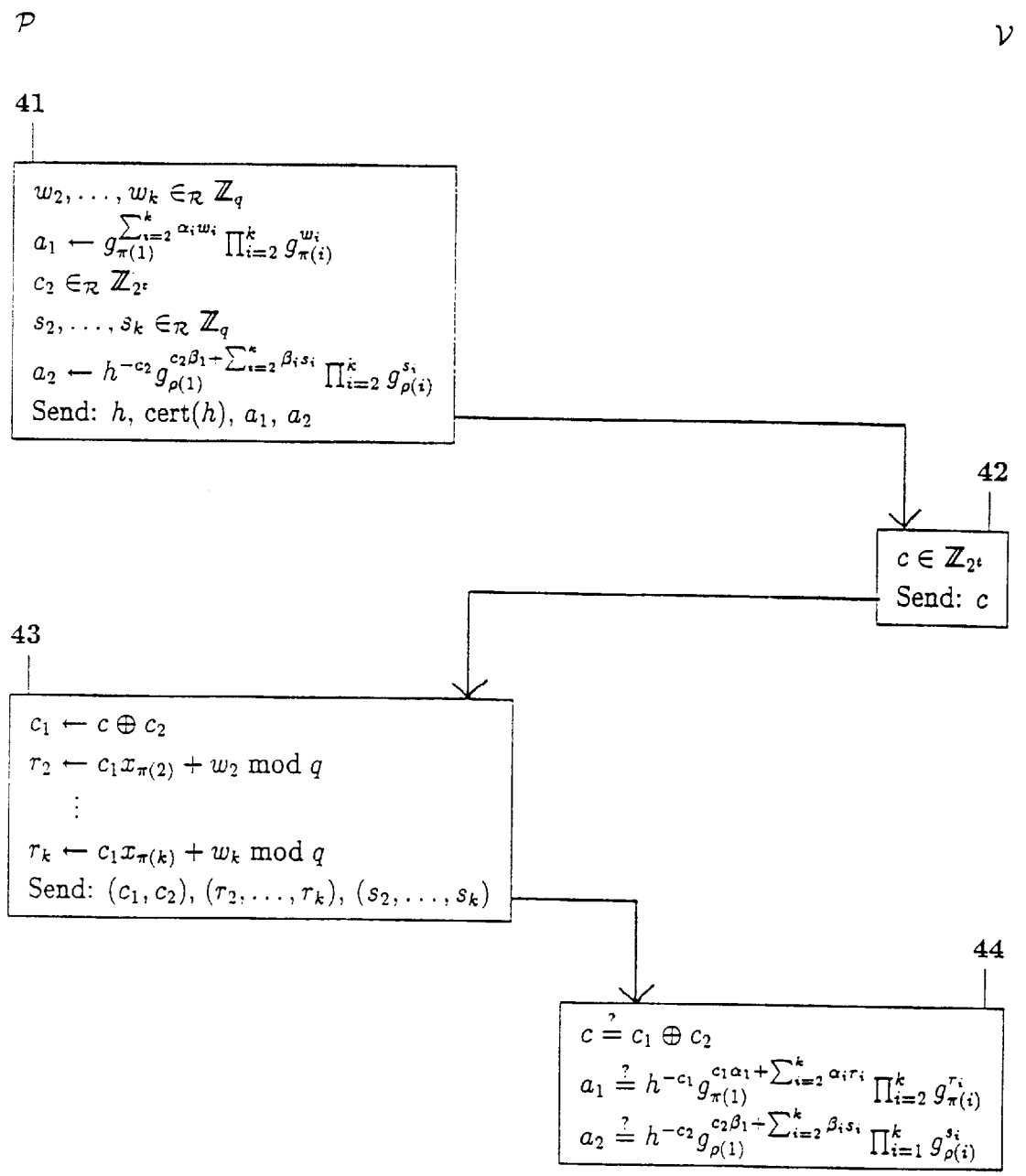
FIG. 4 shows a flowchart of a protocol for demonstrating that at least one of two linear relations pertains to a set of secrets, without revealing additional information about the secrets, in accordance with the teachings of the present invention.

Turning now to FIG. 4, a flowchart of a protocol for demonstrating that at least one of two linear relations applies to a set of secrets, without revealing additional information about the secrets, will now be described in detail.

The situation at the outset is again as in FIG. 1. P has to demonstrate to v that the representation known to it satisfies either the linear relation $x_{\pi(1)} = \alpha_1 + \alpha_2 x_{\pi(2)} \cdots + \alpha_k x_{\pi(k)} \mod q$, or the linear relation $x_{\rho(1)} = \beta_1 + \beta_2 x_{\rho(2)} \cdots + \beta_k x_{\rho(k)} \mod q$, or both. The coefficients $\alpha_i$ and $\beta_i$, for $1 \leq i \leq k$, are elements of $\mathbb{Z}_q$, and $\pi(\cdot)$ and $\rho(\cdot)$ are suitable permutations of $\{1, \ldots, k\}$ that can always be defined to interchange at most two elements each.

If (and only if) the first linear relation holds, then P can compute, for any challenge $c_1$, responses $(r_2, \ldots, r_k)$ such that $$a_1 = h^{-c_1} g_{\pi(1)}^{c_1 \alpha_1 + \Sigma_{i=2}^{k} \alpha_i r_i} g_{\pi(2)}^{r_2} \cdots g_{\pi(k)}^{r_k},$$

where $a_1$ has been generated by P of the form $$g_{\pi(1)}^{\Sigma_{i=2}^{k} \alpha_i w_i} \prod_{i=2}^{k} g_{\pi(i)}^{w_i} \text{ for random } w_2, \ldots, w_k \text{ in } \mathbb{Z}_q.$$

Likewise, if (and only if) the second linear relation holds, then P can compute, for any challenge $c_2$, responses $(s_2, \ldots, s_k)$ such that $$a_2 = h^{-c_2} g_{\rho(1)}^{c_2 \beta_1 + \Sigma_{i=2}^{k} \beta_i s_i} g_{\rho(2)}^{s_2} \cdots g_{\rho(k)}^{s_k},$$

where $\alpha_2$ has been generated by P of the form $$g_{\rho(1)}^{\Sigma_{i=2}^{k} \beta_i v_i} \prod_{i=2}^{k} g_{\rho(i)}^{v_i}$$

for random $v_2, \ldots, v_k$ in $\mathbb{Z}_q$. To perform the proof, P chooses one of the two challenges, $c_1$ or $c_2$, at random by itself, so that it can anticipate that challenge by calculating a suitable $a_i$ from the self-chosen $c_i$ and a set of randomly self-chosen "responses;" this is referred to as a simulated proof. The other challenge cannot be anticipated by P, thereby forcing P to perform a genuine proof. However, P can hide which challenge (and response set) it has chosen by itself.

More specifically, assuming for concreteness that the first linear relation holds and the second does not, P computes $a_2$ by generating at random a challenge $c_2$ and "responses" $s_2, \ldots, s_k$, and computing $$a_2 \leftarrow h^{-c_2} g_{\rho(1)}^{c_2 \beta_1 + \Sigma_s - 2k \rho_i s_i} g_{\rho(2)}^{s_2} \cdots g_{\rho(k)}^{s_k}.$$

For the first relation P performs the basic proof of knowledge. To ensure that P can choose (and hence anticipate) at most one challenge correctly, without revealing which one, v in the protocol sends to P a random challenge c, and P uses challenges $c_1$ and $c_2$ such that, say, the bitwise exclusive-or of $c_1$ and $c_2$ is equal to c.

The first two lines of Box 41 show P computing a number $a_1$, as specified above. The third and fourth lines show P generating at random a self-chosen challenge $c_2$, and k−1 self-chosen responses, $s_2, \ldots, s_k$. As shown in the fifth line, P then computes a number $a_2$, based on $c_2$ and $s_2, \ldots, s_k$. Finally, as shown in the sixth line, P sends h, a digital certificate on h, and $a_1$ and $a_2$ to v; the remarks made for Box 11 apply here also. The numbers $a_1$ and $a_2$ may be called initial witnesses.

The first line of Box 42 shows v generating a challenge number c in $\mathbb{Z}_{2^t}$, and the second line shows v sending c to P.

Box 43 first shows P computing challenge $c_1$, from the self-chosen challenge $c_2$ and the challenge c, by taking their bitwise exclusive-or (denoted by $\oplus$). For the resulting challenge, $c_1$, P then computes k−1 responses, $r_2, \ldots, r_k$, as shown in the next three lines. As shown in the fifth line, P then sends to v the two challenges, the response set for the first linear relation, and the self-chosen response set for the second linear relation.

Box 44 first shows v verifying that P used two challenges, $c_1$ and $c_2$, whose bitwise exclusive-or equals c; this guarantees to v that P could have generated only one of $c_1$, $c_2$, by itself. The second line shows v verifying the response set for the first linear relation, with respect to challenge $c_1$. The third line shows v verifying the response set for the second linear relation, with respect to challenge $c_2$. If all three verifications hold, then v accepts the proof.

Representing atomic propositions by linear relations over $\mathbb{Z}_q$, this inventive technique can be used to demonstrate any satisfiable formula from propositional logic that has only "OR" logical connectives. The protocol described by FIG. 4 demonstrates to v the formula "$(x_{\pi(1)}=\alpha_1+\Sigma_{i=2}{}^k\alpha_i x_{\pi(i)} \bmod q)$ OR $(x_{\rho(1)}=\beta_1+\Sigma_{i=1}{}^k\beta_i x_{\rho(i)} \bmod q)$."

Clearly one of $c_1$, $c_2$ need not be transmitted by P in Box 43, as v can compute it by itself. Furthermore, instead of using in Box 43 the bitwise exclusive-or operator to compute the remaining challenge values from the self-chosen challenge and the challenge of v, other functions can be used. For example, it can be required that $c_1$ and $c_2$ satisfy $c_1+c_2=c \bmod 2^t$.

As will be appreciated, the inventive methods of FIGS. 1, 3 and 4 can be combined in order to demonstrate arbitrary satisfiable formulas from propositional logic, where the atomic propositions are linear relations over $\mathbb{Z}_q$. Hereto such a formula F can be expressed in the format "$Q_1$ AND $Q_2$ AND ... AND $Q_1$," where sub-formula $Q_i$ has the format "$R_{1i}$ OR $R_{2i}$ OR ... OR $R_{1i}$;" and each of subsub-formulas $R_{1i}, R_{2i}, \ldots, R_{li}$ is a formula from propositional logic that connects linear relations over $\mathbb{Z}_q$ by "AND" connectives, at most one "NOT" connective, and no other logical connectives. By using the inventive technique of FIG. 4, to demonstrate one out of l representations, P can then demonstrate the sub-formula $Q_i$. To prove the formula F, P needs to demonstrate separately each of the sub-formulas $Q_1, Q_2, \ldots, Q_l$. These l sub-formula proofs can be performed in parallel, and responsive to the same challenge. An example, based on example 2, follows.

EXAMPLE 3

Consider the linear relations $S_1$="$(x_1=2x_3+3x_4+5 \bmod q)$," $S_2$="$(x_2=6x_4=7 \bmod q)$," $S_3$="$(x_3=4x_4+8 \bmod q)$," $S_4$="$(x_1=5x_2+7 \bmod q)$," $S_5$="$(x_2=3x_4+2 \bmod q)$," $S_6$="$(x_1=x_2+x_4+3 \bmod q)$," and $S_7$="$(x_2=3x_3+7 \bmod q)$," and $h=\Pi_{i=1}^5 g_i^{x_i}$. Suppose that P has to demonstrate the formula F="$(S_1$ AND $S_2$ AND (NOT ($S_3$ OR $S_7$)) AND $S_6$) OR ((NOT ($S_4$ OR $S_7$)) AND $S_5$ AND $S_6$)." By applying the rules of propositional logic, F can be re-written in the format "(($S_1$ AND $S_2$ AND (NOT $S_3$)) OR ((NOT $S_4$) AND $S_5$)) AND ($S_6$ AND (NOT $S_7$))." Let now $R_{11}$="$S_1$ AND $S_2$ AND (NOT $S_3$)," $R_{12}$="(NOT $S_4$) AND $S_5$," and $R_{22}$="$S_6$ AND (NOT $S_7$)," and $Q_1$="$R_{11}$ OR $R_{12}$," and $Q_2=R_{22}$. P can then demonstrate the formula F to v by separately proving sub-formula $Q_1$ and sub-formula $Q_2$. To demonstrate $Q_1$, P can demonstrate knowledge of a representation of $g_1{}^2g_3$ with respect to $(h^{-1}g_1{}^{21}g_2{}^{-7}g_3{}^8, g_1{}^{11}g_2{}^6g_3{}^4g_4, g_5)$ (cf. example 2), or knowledge of a representation of $g_1$ with respect to $(h^{-1}g_1{}^{17}g_2{}^3, g_1{}^{15}g_2{}^3g_4, g_3, g_5)$, or both. Hereto the inventive technique of FIG. 4 can be used straightforwardly: P first provides two numbers, $a_1$ and $a_2$, both in $G_q$, to v; responsive to a challenge, c, P provides to v a first set of responses, $(r_1, r_2, r_3)$ responsive to a challenge $c_1$, and a second set of responses, $(s_1, s_2, s_3, s_4)$, responsive to a challenge $c_2$; and v verifies that $a_1=h^{-r_1}g_1{}^{-2c_1+21r_1+11r_2}g_2{}^{-7r_1+6r_2}g_3{}^{-c_1+8r_2+4r_2^2}g_4{}^{r_2}g_5{}^{r_3}$ and $a_2=h^{-s_1}g_1{}^{-c_2+17s_1+15s_2}g_2{}^{2s_1+3s_2}g_3{}^{s_3}g_4{}^{s_2}g_5{}^{s_4}$, and accepts if both verifications hold. Here P is allowed to choose one of $c_1$, $c_2$, freely by itself, subject to $c_1 \oplus c_2=c$, it correspondingly chooses the appropriate response set at random by itself. and computes one of the two numbers, $a_1$, $a_2$, in such a manner from the self-chosen challenge and response set that the verification by v holds. Similarly, to demonstrate Q2, P must demonstrate knowledge of a representation of $g_1g_4$ with respect to $(h^{-1}g_1{}^{10}g_4{}^7, g_1g_2, g_1{}^{-3}g_3g_4{}^{-3}, g_5)$. P hereto provides a number, $a_3$ in $G_q$, to v; responsive to a challenge, $c_3$, P computes a response set such that $a_3=h^{-r_1}g_1{}^{-c_3+10r_1+t_2-3t_3}g_2{}^{t_2}g_3{}^{7t_1+3t_3}g_4{}^{-c_3+7t_1-3t_3}g_5{}^{t_4}$; and v verifies the response set. By performing the two proofs in parallel, c can be taken equal to $c_3$, so that only one challenge is needed from v. Furthermore, a signed proof of F consists of $(a_1, a_2, a_3)$, challenge $c=c_3$ computed as a one-way hashvalue of at least $(h, (a_1, a_2, a_3))$, (one of) $c_1$ and $c_2$, and the three response sets. Depending on how much conviction the signed proof should convey, the hash should or need not operate on a description of F, or perhaps only on partial information about F. [End of example 3]

The inventive technique can more generally be used to demonstrate knowledge of at least m out of $1 \geq m$ representations. Hereto P simulates the proof of knowledge for the at most l−m linear relations that do not hold, by generating self-chosen challenge values and response sets; and P performs a genuine proof of knowledge for the linear relations that do hold. (Alternatively, P can perform genuine proofs of knowledge for exactly m relations that hold, and simulate the proof for the l−m remaining relations, regardless of whether one of these holds as well.) The l challenge values must then be forced to be such that P can choose any l−m freely, but not more, without revealing which it has chosen freely. Hereto the l challenge values can be required, for example, to satisfy m pre-specified independent linear relations. Note that this generalized method need never be applied for m greater than 1: any satisfiable formula can be demonstrated by applying the inventive technique for demonstrating a formula consisting of zero or more "AND" connectives and at most one "NOT" connective, and the inventive technique for demonstrating knowledge of 1 out of l representations. However, the technique for proving knowledge of $m \geq 2$ representations out of l can be used to improve efficiency. For example, to demonstrate the formula "($R_1$ AND $R_2$) OR ($R_1$ AND $R_3$) OR ($R_2$ AND $R_3$)," P can use the m=2, l=3 situation; application of the m=1, l=3 case might result in a less efficient proof (for example when both $R_1$ and $R_2$ contain a "NOT" connective).

For greater efficiency, v can process the l verifications simultaneously, similar a batch-processing technique known in the art for verifying DSA signatures (See, Naccache, D., M'Raihi, D., Vaudenay, S. and Raphaeli, D., "Can D.S.A. be Improved? —Complexity Trade-Offs with the Digital Signature Standard—," Advances in Cryptology—EUROCRYPT '94, Lecture Notes in Computer Science, Springer-Verlag, 1995, pp. 77–85). To batch-process $1 \geq 2$ verification relations, $a_i \stackrel{?}{=} h^{u_i}\pi_{j=1}^k g_j^{u_{ij}}$ for $1 \leq i \leq l$, where the $u_i$'s and the $u_{ij}$'s are expressions in terms of the responses of P, v generates random numbers $p_1, \ldots, p_k$ and verifies the single relation $\pi_{i=1}^l a_i^{p_i} \stackrel{?}{=} h\Sigma_{i=1}^{p_i u_i} \Sigma_{j=1}^k g_j^{\Sigma_{i=1}p_i u_{ij}l}$. The size of the set from which the $p_i$'s are chosen determines the security level, and a small optimization is to take $p_1$ always equal to 1.

The inventive method of FIG. 4 is related to a method known in the art (See, Cramer, R., Damgard, I., and Schoenmakers, B., "Proofs of Partial Knowledge and Simplified Design of Witness Hiding Protocols," Advance in Cryptology—CRYPTO '94, Lecture Notes in Computer Science, Springer-Verlag, 1995). As will be appreciated, the methods differ in two important respects. The reference method applies only to situations in which P demonstrates knowledge of m out of $1 \geq m$ subsets of k secret keys, each of which corresponds to one of k public keys. In other words, it allows P to prove monotone formulas from propositional logic (meaning that only "AND" and "OR" connectives are present), the formulas always being satisfiable because the atomic propositions are of the form "P knows the secret key corresponding to the i-th public key," for $1 \leq i \leq k$. In contrast, with the inventive techniques only one public key is present, to which a multitude of secret keys correspond, and any satisfiable formulas from propositional logic can be demonstrated, the atomic propositions being linear relations over $\mathbb{Z}_q$. However, as will be appreciated clear, the reference method can be used to optimize the inventive method for demonstrating arbitrary satisfiable formulas from propositional logic for linear relations. Namely, one can interpret an atomic proposition for the reference method to correspond to a sub-formula that is a system consisting of linear relations and at most one linear inequality; as has been detailed in the description of FIG. 3, one such sub-formula requires P to demonstrate knowledge of a representation of a number with respect to a tuple consisting of k base numbers, in other words to demonstrate knowledge of a secret key corresponding to a distorted public key. For example, a formula F in conjunctive normal form "($R_{11}$ AND $R_{21}$ AND ... AND $R_{l1}$) OR ... OR ($R_{12}$ AND $R_{22}$ AND ... AND $R_{m2}$)," where each $R_{ij}$ is a sub-formula from propositional logic that connects linear relations over $\mathbb{Z}_q$ by zero or more "AND" connectives and at most one "NOT" connective, can be demonstrated efficiently by applying a construction known in the art (see, Benaloh, J., and Leichter, J., "Generalized Secret Sharing and Monotone Functions, Advance in Cryptology—CRYPTO '88, Lecture Notes in Computer Science, Springer-Verlag, pp. 25–35) in order to restrict the manner in which P can generate self-chosen challenges from the challenge that is supplied by v. An example follows.

EXAMPLE 4

Consider the linear relations of example 3, $S_1, \ldots, S_7$, with $h = \Sigma_{i=1}^{5} g_i^{x_i}$. Suppose now that P has to demonstrate the formula F="($S_1$ AND (NOT $S_2$) AND (NOT $S_3$)) OR ($S_4$ AND $S_5$ AND (NOT $S_6$) AND (NOT $S_7$))." F can be re-written in the format "($R_{11}$ AND $R_{21}$) OR ($R_{12}$ AND $R_{22}$)," where $R_{11}$="$S_1$ AND (NOT $S_2$)," $R_{21}$="NOT $S_3$," $R_{12}$="$S_4$ AND (NOT $S_6$)," and $R_{22}$="$S_5$ AND (NOT $S_7$)" are all sub-formulas of F. Note that if, say, sub-formula $R_{12}$ would not contain a "NOT" connective, then sub-formulas $R_{12}$ and $R_{22}$ could have been lumped together into one sub-formula. Now, in terms of the reference method this means that P has to demonstrate knowledge of a first and a second secret key, or a third and a fourth secret key. Hence P, after having computed four numbers $a_1, \ldots, a_4$, corresponding to $R_{11}, R_{12}, R_{22}, R_{22}$, respectively (cf. example 2), can perform the demonstration by deriving four challenges, $c_1, \ldots, c_4$ from a challenge c of v. The four challenges must be such that P can either choose $c_1, C_2$ by itself but not $c_3, c_4$, or can choose $c_3, c_4$ by itself but not $c_1, c_2$. For the part of the formula that is true, say "$R_{12}$ AND $R_{22}$," P can then perform a genuine proof of knowledge, and the "$R_{11}$ AND $R_{21}$" part, which may not be true, can be simulated by using self-chosen responses and self-chosen challenges $c_1, c_2$. According to the construction of Benaloh and Leichter in the abovementioned reference, $c_1, \ldots, c_4$ can be taken to satisfy the restrictions $c_1 = c_2$, $c_3 = c_4$, and $c_1 \oplus c_3 = c \bmod 2^t$, which must be checked by v as part of the verification process. [End of example 4]

As will be clear to those of ordinary skill in the art, all the techniques described in relation to FIG. 1 also apply to the inventive technique of FIG. 4, and to its generalizations. Also, the technique of using correction factors, demonstrated by the inventive technique of FIG. 2, can be used. v can also restrict the number of correction factors, and/or the relations they need to satisfy, in order to restrict the set of formulas that can be anticipated by P, as described for FIG. 2.

Application of the inventive techniques, as well as the described generalizations, variations and related techniques, based on the difficulty of computing RSA-roots is believed to be straightforward for those of ordinary skill in the art, when studying the drawings in conjunction with the detailed descriptions; a detailed description is therefore omitted.

Turning now to FIG. 5, a flowchart of a protocol for demonstrating that a system of linear relations applies to a set of secrets, without revealing additional information about the secrets unless performed more than once, will now be described in detail.

As in FIG. 1, P at the outset knows a representation $(x_1, \ldots, x_k)$ of a number h in $G_q$ with respect to $(g_1, \ldots, g_k)$. The inventive technique enables P to demonstrate to v that its representation satisfies the $l \geq 1$ independent linear relations that have been described with respect to FIG. 1. such that the demonstration cannot be performed responsive to two different challenges without revealing the entire representation of P. The technique is as follows.

P initially commits to a number a in $G_q$, computed according to $\Sigma_{i=1}^{k} g_i^{w_i}$ for randomly generated numbers $w_1, \ldots, w_k$ in $\mathbb{Z}_q$. Hereto a party authorized to issue certificates can issue a digital certificate on at least (h, a), which must be revealed by P when performing the proof. For concreteness, but without loss of generality, it will be assumed that P does not need to know the particular system of relations to be demonstrated at the time of computing a. Applying the inventive technique of FIG. 2, when performing its demonstration P also sends a set of l correction factors, all in $\mathbb{Z}_q$, to v; these correction factors are used to adjust a such that the representation known to P of the "new" a is suitable to perform the demonstration. The adjustment consist of dividing a by the product $\Sigma_{i=1}^{l} g_{\pi^{e_i}}(k-l+i)$. By performing the protocol of FIG. 1, with the adjusted number playing the role of a, and expanding the resulting expressions, the protocol of FIG. 5 results.

The first three lines of Box 51 show P computing computing l correction factors, $e_1, \ldots, e_l$, all in $\mathbb{Z}_q$. As shown in the fourth line, P then sends (h, a), a digital certificate on (h, a), and the l correction factors to v. Depending on the application, v may be able to retrieve (h, a) and the certificate from a public-key directory or the like, or a certificate is not needed because v can check the correctness of (h, a) in some other way.

The first line of Box 52 shows v generating a challenge number c in $\mathbb{Z}_{2^t}$, and the second line shows v sending c to P.

The first three lines of Box 53 show P computing k−l response numbers, $(r_1, \ldots, r_{k-l})$, and the fourth line shows P sending these to v.

The first three lines of Box 54 show v computing l numbers, $r_{k-l+1}, \ldots, r_k$. The fourth line shows v verifying the k−l responses provided by P. If the verification holds, then v accepts the proof. Not shown is v storing (h, a), c, and $(r_1, \ldots, r_k)$ in a database. (Alternatively, only a hash of (h, a) is stored, instead of (h, a). Furthermore, depending on what information of P's representation should be computable when P performs two demonstrations using the same (h, a), it may suffice or be more efficient to store information derived from c and $(r_1, \ldots, r_k)$. These variations are discussed in detail shortly.)

As will be clear to those of ordinary skill in the art, v could access the database directly in Box 52, to check whether P has already used the same (h, a) before: in that case only (h, a) (or only h or a hash of it, depending on the application) needs to be stored in the database. The inventive technique of FIG. 5 is especially concerned with situations in which such on-line checking may not (always) be feasible. This is plausible when v is distributed, and many demonstrations are performed by prover parties. In that case it is more practical for a central party (typically representing the issuer of the certificate on (h, a)) to maintain the database, and for v to contact the central party only occasionally, in order to send to it the transcripts of protocol executions (and possibly also a description of the formula demonstrated, to inform the central party of the particular system that has been demonstrated). Exemplary applications are off-line electronic cash systems and, more generally, credential mechanisms, as detailed in U.S. Pat. No. 5,521, 980.

In case P performs the demonstration a second time, using the same (h, a), and responsive to a challenge c' differing modulo $2^t$ from c, but not necessarily applying to the same system of linear relations, the corresponding numbers, $(r'_1, \ldots, r'_k)$, allow the representation $(x_1, \ldots, x_k)$ to be computed afterwards by the party controlling the database. Specifically, $x_i$ can be computed as $(r_i - r'_i)(c - c')^{-1} \bmod q$, for $1 \leq i \leq k$. In case it suffices for only one particular $x_i$ to be computable when P performs the demonstration more than once, it suffices to store only $r_i$ instead of the entire vector $(r_1, \ldots, r_k)$. Still greater database storage efficiency may be achieved by storing only part of (h, a), or a one-way hash of h or (h, a), in order to check for collisions.

Especially in case the interests of the central party, which maintains the database, are not the same as the interests of v, the central party may prefer to require v to perform a signed proof with P. To ensure that the signed proof irrefutably shows which particular formula has been demonstrated, the challenge c in Box 52 can be determined as a one-way hashvalue of at least a, a description of the formula demonstrated, the vector $(e_1, \ldots, e_l)$, and possibly also h and additional information (such as time and date of the protocol execution, the identity of the holder of v, and so on). In this cased, when v sends the transcript of the protocol execution to the central party, it must also send along the description of the formula that has been demonstrated.

As will be clear to those of ordinary skill in the art, a in Box 51 may be computed by P to be of forms other than $\Sigma_{i=1}^k g_i^{w_i}$; P must then compute the l correction factors correspondingly, in Box 51. The protocol in FIG. 5 enables P to perform any system of linear relations, without needing to know the system in advance. Clearly, if P should only be allowed to demonstrate one particular system of linear relations, such that when performed twice the representation is revealed, no correction factors should be allowed in the protocol; this requires P to compute a of the appropriate form right from the start (cf. Box 11). More generally, as already detailed in the description of FIG. 2, v may impose restrictions on the number and form of the correction factors that P may use; in this manner it can be ensured that P can demonstrate any one of a restricted set of formulas without revealing additional information, while the set of secrets of P can be computed if it performs any two formulas from the restricted set for the same (h, a). The certifying party can encode the number and the form of correction factors that P is allowed to use into the certificate, or into one of the $x_i$'s.

As will be clear to those of ordinary skill in the art, all the techniques described in relation to FIG. 1 also apply to the inventive technique of FIG. 4, and to its generalizations. Furthermore, the technique of using correction factors, demonstrated by the inventive technique of FIG. 2, can be used. Of special interest here is the technique for signed proofs to not hash $(e_1, \ldots, e_l)$ along when determining c, as already described with respect to FIG. 2. This may be desirable in applications in which v wants to hide from the central party the formula that has been demonstrated by P, while enabling the central party to compute (part of) the representation of P in case P uses (h, a) more than once. An exemplary such application is an off-line electronic cash system, as described in U.S. Pat. No. 5,521,980, where (h, a) represents a digital coin. The numbers $x_l, \ldots, x_k$ may represent characteristics of P, such as income category etcetera, some of which P can choose to reveal to v (the merchant) in order to get a discount; v may prefer not to reveal the income category of P to the central party (the bank), so as to protect the privacy of its customers.

In a manner similar to that described in U.S. Pat. No. 5,521,980, it can be ensured that the representation of P can be computed if and only if P performs more than u demonstrations, for an arbitrary pre-determined integer u. Hereto, P should commit on $(h, a_1, \ldots, a_u)$, where each of $a_1, \ldots, a_u$ is determined in the same way as a in FIG. 5. When performing the i-th demonstration with respect to $(h, a_1, \ldots, a_u)$, where $1 \leq i \leq u$, P uses the pair $(h, a_i)$. Several approaches exist to implementing the commitment: one is to build a binary tree with the $a_i$'s as the leaves, each other node being the one-way hash of the child nodes, and having the root node and h certified; another is to have $(h, a_1, \ldots, a_u)$ certified directly.

Embodying the inventive techniques based on the difficulty of computing RSA-roots is believed to be straightforward for those of ordinary skill in the art when studying the drawings in conjunction with the detailed descriptions; hence a detailed description is omitted here.

Figure 6:
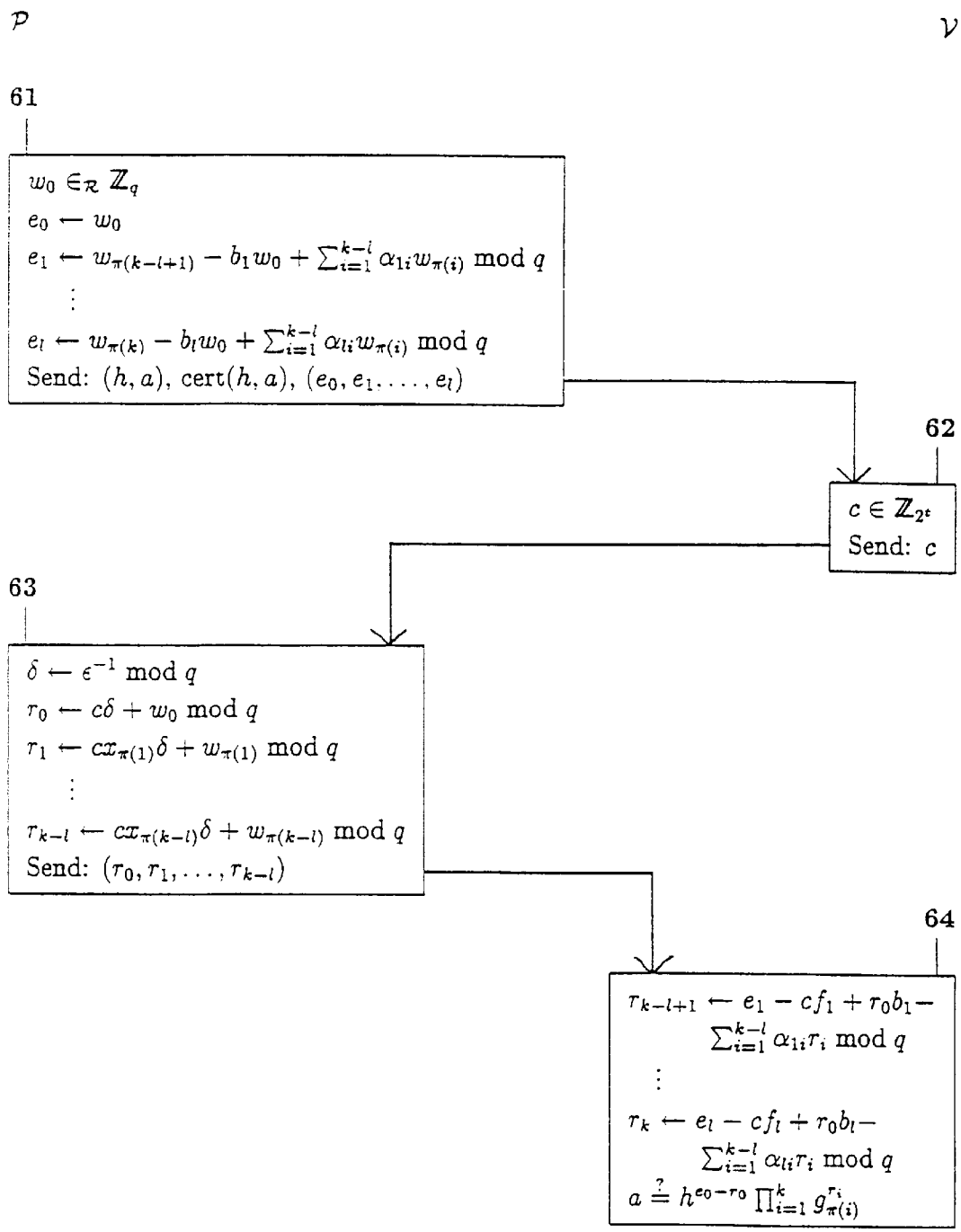
FIG. 6 shows a flowchart of a protocol for demonstrating a satisfiable formula that connects linear relations, pertaining to a set of secrets, by zero or more "AND" connectives and at most one "NOT" connective, revealing additional information about the secrets if and only if performed more than once, in accordance with the teachings of the present invention.

The protocol of FIG. 5 does not allow P to demonstrate formulas from propositional logic that have zero or more "AND" connectives and one "NOT" connective, in such a manner that additional information about its secrets is revealed if and only if demonstrating more than a predetermined number of times. Turning now to FIG. 6, a flowchart of a protocol for demonstrating that a satisfiable formula applies to a set of secrets, the formula connecting linear relations by zero or more "AND" connectives and at most one "NOT" connective, without revealing additional information about the secrets unless performed more than once, will now be described in detail.

As has been described in detail in relation to FIG. 3, any such formula can be expressed by the matrix equation $$\begin{pmatrix} a_{11} & \cdots & a_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ a_{l1} & \cdots & a_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 - f_1 \epsilon \\ \vdots \\ \vdots \\ b_l - f_l \epsilon \end{pmatrix} \bmod q,$$

where $f_1, \ldots, f_l$, are numbers in $\mathbb{Z}_q$, and $\epsilon$ is a non-zero difference term. To enable P to demonstrate any satisfiable formula that connects linear relations by zero or more "AND" connectives and at most one "NOT" connective, it is assumed that P is allowed to reveal up to l+1 correction factors, l of which are used to adjust the exponents pertaining to $(g_{\pi(k-l+1)}, \ldots, g_{\pi(k)})$, and one to adjust the exponent pertaining to h. (Again, alternatively restrictions may be placed upon the correction factors to limit the class of formulas that can be demonstrated, and by not allowing any restriction factors P can only anticipate one formula when computing a; the necessary modifications are believed straightforward to those of ordinary skill in the art.) Specifically, P at the start knows a randomly generated representation $(w_l, \ldots, w_k)$ of a with respect to $(g_1, \ldots, g_k)$, and the protocol is as follows.

The first line of Box 61 shows P computing a random number $w_0$ in $\mathbb{Z}_q$, which it will use to adjust the exponent corresponding to h. The next four lines show P computing computing l+1 correction factors, $e_0, e_1, \ldots, e_l$, all in $\mathbb{Z}_q$. As shown in the fifth line, P then sends (h, a), a digital certificate on (h, a), and the l+1 correction factors to v; the remarks made for Box 51 apply here also.

The first line of Box 62 shows v generating a challenge number c in $\mathbb{Z}_{2^t}$, and the second line shows v sending c to P.

The first line of Box 63 shows P computing the multiplicative inverse, $\delta$, of the difference number $\epsilon$. The difference number can be computed by P from one of the l linear equations that are specified by the matrix relation. The next four lines show P computing k–l+1 response numbers, and the sixth line shows P sending the response numbers to v. The first five lines of Box 64 show v computing l numbers, $r_{k-l+1}, \ldots, r_k$ (the descriptions of the computations for $r_{k-l+1}$ and $r_k$ take up two lines each in the figure, which is only for display convenience). The sixth line shows v verifying the k–l+1 responses provided by P. If the verification holds, then v accepts the proof. Not shown is v storing (h, a), c, and $(e_0-r_0 \bmod q, r_1, \ldots, r_k)$ in a database.

The techniques detailed and referenced in the description of FIG. 5 all hold here as well. In particular, the inventive technique is particularly useful in case a central party maintains the database; in case P performs a second demonstration with respect to (h, a), responsive to different challenge, the representation $(x_1, \ldots, x_k)$ can be computed afterwards by the party controlling the database (and, instead of storing $(e_0-r_0 \bmod q, r_1, \ldots, r_k)$, it suffices to store $(r_1(e_0-r_0)^{-1} \bmod q, \ldots, r_k(e_0-r_0)^{-1} \bmod q)$); similar techniques for greater database storage can be used; when the interests of the central party, which maintains the database, are not the same as the interests of v, the central party should in general require v to perform a signed proof with P; whether the signed proof convinces of the particular formula that has been demonstrated, only that one out of a subclass of formulas has been demonstrated, or of merely the fact that P knows a representation of h, can be determined by which information about the correction factors and/or the demonstrated formula is hashed along; the number of times that P may use (h, a) in a demonstration can be any pre-determined integer; and, application to a situation in which P consists of T and U, and to embodiments related to the difficulty of RSA-roots, are straightforward.

Still more generally, P can be enabled to demonstrate any satisfiable formula from propositional logic, atomic propositions being linear relations over $\mathbb{Z}_q$, in such a manner that more than one such demonstration reveals $(x_1, \ldots, x_k)$.

Any satisfiable formula from propositional logic that has "AND" connectives, more than one "NOT" connective, and no "OR" connectives, can be split into several separate proofs for sub-formulas, such that each proof for a sub-formula can be dealt with as in FIG. 5 or 6 (cf. the description of FIG. 3). For a signed demonstration of the formula with respect to (h, a), the proofs for the sub-formulas can all be performed in parallel, responsive to a single challenge c. When the demonstration for the formula has been separated into, say, m parallel proofs of sub-formulas, the proof of the i-th sub-formulas requires P to send a number $a_i$, in the same way as P has to send a number a in Boxes 51 and 61. For a signed proof, the challenge c of v must now be computed as a one-way hashvalue of at least $(a_1, \ldots, a_m)$. Furthermore, $a_1, \ldots, a_m$ must be chosen by P such that their product, $\Sigma_{i=1}^m a_i$, is equal to an adjusted form of a. More precisely, P is allowed to reveal in the demonstration of the formula, up to k+1 correction factors, $(e_0, \ldots, e_k)$, that are used to adjust a to $a(h^{e_0}\Sigma_{i=1}^k g_i^{e_i})^{-1}$, ;and $\Sigma_{i=1}^m a_i$ must be equal to $a(h^{e_0}\Sigma_{i=1}^k g_i^{e_i})^{-1}$. As will be clear to those of ordinary skill in the art, this allows the representation $(x_1, \ldots, x_k)$ to be computed from any two transcripts responsive to different challenges. Specifically, in accordance with FIG. 6, for each i between 1 and m, P must reveal a response set for the i-th sub-formula proof, and v can verify the sub-formula proof in accordance with the verification relation described by the fourth line of Box 64; by multiplying all verification relations, one for each sub-formula proof and hence m in total, and multiplying the outcome by $(\Sigma_{i=0}^k g_i^{e_i})^{-1}$, one relation of the form $a=h^{-z_0}g_1^{z_1} \ldots g_k^{z_k}$ results (this computation need not actually be performed by v) where each of the k+1 exponents $z_0, \ldots, z_k$ is a linear combination involving correction factors, response numbers of each of the i sub-formula proofs, the challenge value, and coefficients that specify the formula demonstrated by P; and. by storing the challenge value and $(z_1/z_0 \bmod q, \ldots, z_k/z_0 \bmod q)$, the database maintaining party can compute the representation, $(x_1, \ldots, x_k)$, in case P performs two demonstrations with respect to (h, a).

Arbitrary satisfiable formulas from propositional logic can also involve "OR" connectives. To deal with such formulas, the inventive technique for demonstrating arbitrary formulas that has been described in relation to FIG. 4 can be applied, together with the inventive technique described in the preceding paragraph for ensuring that any two demonstrations reveal $(x_1, \ldots, x_k)$. Specifically, the formula to be proven by P is split up into sub-formula proofs. say m in total. each of which can be performed responsive to a challenge number. The m challenge numbers must be determined by P from a single challenge value of v (a one-way hashvalue in case of a signed proof), subject to restrictions that are in accordance with the formula that P has to demonstrate (cf. example 3). As detailed in the preceding paragraph, P may release up to k+1 correction factors in order to adjust a (and suitable restrictions may be imposed), and the adjusted a must be equal to $\Sigma_{i=1}^k a_i$, where $a_i$ is a number sent by P in the i-th sub-formula proof (playing the same role as a in Box 61). Again, from all the m response sets, the description of the formula that is proven by P, its challenge value, and the correction factors (if any), one obtains a single relation of the form $a=h^{-z_0}g_1^{z_1} \ldots g_k^{z_k}$. Storing the challenge value and $(z_1/z_0 \bmod q \ldots, z_k/z_0 \bmod q)$ is sufficient to enable computation of $(x_1, \ldots, x_k)$ in case P performs any two demonstrations of satisfiable formula from propositional logic with respect to (h, a).

Again, a detailed description is omitted, as are a description of embodiments of which the security is related to the difficulty of computing RSA-roots, and a description of applying the inventive techniques to a situation in which P consists of two parties; those of ordinary skill in the art are believed to find little difficulty in providing these descriptions by studying the drawings in conjunction with the corresponding descriptions.

This concludes the detailed descriptions of the preferred embodiments. While these descriptions of the present invention have been given as examples, it will be appreciated by those of ordinary skill in the art that various modifications, alternate configurations, and equivalents may be employed without departing from the spirit and scope of the present invention. For example, there are many essentially equivalent orders to evaluate expressions; ways to evaluate expressions; ways to order expressions, tests. and transmissions within flowchart boxes; ways to group operations into flowchart boxes, and ways to order flowchart boxes. The particular choices that have been made here are merely for clarity in exposition.

Certain variations and substitutions may be apparent to those of ordinary skill in the art. For example, instead of sending a, and hashing a when computing the challenge c for a signed proof, a collision-intractable hash of a can be used; of course, the verifications by v then have to be adjusted correspondingly. Furthermore, the inventive techniques can also be applied in a group that is not of prime order. In that case the secrets of P are no longer in a field. but in a ring that can have zero divisors. whence the choice for a group of prime order is believed preferable in many applications; however, this need not be a problem, because the zero-divisors may be hard to find (such as is the case when working in a multiplicative group having an order equal to equal to the product of two large primes), or it may even be advantageous for the application at hand that zero-divisors can be found. For example, by demonstrating that $Ax_1=B$ mod $2_q$, where A is even, P demonstrates that $x_i$ has one of two values, differing by q, without revealing which one. Likewise, in case the inventive techniques are based on RSA groups, the exponent v need not necessarily be a prime; for example, v can instead be taken to be the product of two primes. Again, the secrets of P then are in a ring that has zero divisors, and by taking v to be the product of two large primes it can be made infeasible for P to find zero-divisors, and sometimes it may be useful that zero-divisors can be found. Other variations and substitutions have been indicated and sometimes described in detail in the text.

It will also be obvious to those of ordinary skill in the art how parts of the inventive techniques and protocols disclosed here can be used to advantage. For example, the credential techniques described in U.S. Pat. No. 5,512,980 can be applied in conjunction with the inventive techniques of the present application: h, or (h, a) can be certified using a secret-key certificate, as described in U.S. patent application Ser. No. 08/321,855; certificates can be issued by means of a restrictive blind issuing protocol, meaning that at least some of $x_i, \ldots, x_k$ are encoded into h by the certificate issuing authority, while the certificate and (h, a) are hidden from the certificate issuing authority: and. when v is convinced that P knows representations of each of two numbers, $h_1$ and $h_2$, with respect to $(g_i, \ldots, g_k)$, linear relations can be demonstrated for the numbers in the two representations, by applying the inventive techniques to the quotient $h_1 h_2^{-1}$. One particular application of proving formulas for $h_1 h_2^{-1}$ is when $h_2$ is a pseudonym of P: this allows P to demonstrate, possibly in the form of a sub-formula of a formula that it has to demonstrate. that the exponent indicating the identity of the pseudonyvm-owner is the same in both representations.

Another example pertains to so-called undeniable signatures, well-known in the art. With $h=g_1^{x_1} g_2^{x_2} g_3^{x_3}$ being the public key of the signer, and $(x_1, x_2, x_3)$ its secret key, an undeniable signature on a message m can be taken to be any linear relation involving two of the numbers $x_1, x_2, x_3$, such that m is one of the coefficients of the linear relation (for example, $x_1+mx_2$ mod q can be taken). To confirm the signature, the method of FIG. 1 can be used; and to deny a signature, the method of FIG. 3 can be used. In both case, the zero-knowledge variation of the protocol should be used, which as described requires either a repetition of the four steps for small challenges, or a five-step protocol in which the first step is a commitment of v on its challenge. As will be appreciated. this method improves significantly upon an undeniable signature scheme well-known in the art (see, Chaum, D., Heyst, E., and Pfitzmann, B.. "Cryptographically undeniable signatures, unconditionally secure for the signer," Advances in Cryptology-Crypto '91, Lecture Notes in Computer Science 576, Springer-Verlag, pp. 470–484). Furthermore, the same construction can be based on the difficulty of computing RSA-roots, as will be clear to those of ordinary skill in the art.

What is claimed is:

1. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first nunber and each nunber in said first vector of numbers being a product of powers of numbers in the set, $\{h, g_1, \ldots, g_k\}$, and their inverses and wherein said formula is represented by "$R_1$ OR . . . OR $R_i$," and each sub-formula $R_i$ for $1 \leq i \leq l$, connects linear relations in said secrets by zero or more "AND" connectives and at most one "NOT" connective.

2. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and wherein said formula has at least one "OR" logical connective, said apparatus further comprising simulating means for simulating, using self-chosen challenges and self-chosen responses, the demonstration of knowledge of at least one second number with respect to at least one second vector of numbers.

3. A communication system comprising an apparatus for demonstrating by a prover entity to a Verifier entity that a plurality of secrets, $(x_1, \ldots x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and said apparatus being operated by at least two parties, each of said at least two parties holding some but not all of said plurality of secrets.

4. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible, and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and said demonstrating means further comprising:

randomness generating means, for generating k substantially random numbers, $(w_1, \ldots, w_k)$, each in $Z_{qi}$ initial witness computing means, for computing $$a \leftarrow h^{-w_1} g_{\pi(l)}^{\sum_{i=1}^{k} \alpha^i w^j} \prod_{i=2}^{k} g_{\pi(i)}^{w_i};$$

response generating means, for computing k response numbers, $r1, \ldots, rk$, in response to a challenge number, c, according to $r1 \leftarrow c\sigma + w_1 \bmod q$ and $r_i \leftarrow Cx_{\pi(i)}\delta + w_1 \bmod q$ for $2 \leq i \leq k$, where $\delta$ is equal to $$\left(\left(\alpha_l + \sum_{i=2}^{k} \alpha_i \chi_{\pi(i)}\right) - x_{\pi(l)}\right)^{-1} \bmod q;$$

and transmissions means, for transmitting signals representative of at least said k response numbers.

5. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses, and wherein said formula is represented by a system consisting of at least one independent linear equation and exactly one linear inequality, $$\begin{pmatrix} \alpha_{11} & \cdots & \alpha_{1,k-1} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-1} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 - f_1\epsilon \\ \vdots \\ \vdots \\ b_l - f_l\epsilon \end{pmatrix} \bmod q,$$

where $\pi(-)$ is a permutation of $\{1, \ldots, k\}$, q denotes the order of said group and $\epsilon$ is a non-zero difference number in $Z_q$, and said first number is equal to $$\prod_{i=1}^{l} g_{\pi(k-l+i)}^{f_1},$$

and said first vector of numbers is equal to $$\left(h^{-1}\prod_{i=1}^{l} g_{\pi(k-l+i)}^{b_1}, g_{\pi(1)} \prod_{i=1}^{l} g_{\pi(k-l+i)}^{-a_1}, \ldots, g_{\pi(k-1)} \prod_{i=1}^{l} g_{\pi(k-l+i)}^{-a_{l,k-1}}\right).$$

6. A communication system comprising an apparatus for demonstrating by a prover entity to a Verifier entity that a plurality of secrets, $(x_1, \ldots, x_k)$ of the Prover, satisfy a fonrula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and wherein said formula is represented by the linear inequality, $$\chi_{\pi(1)} \neq \alpha_1 + \alpha_2 \chi_{\pi(2)} \ldots + \alpha_k \omega_{\pi(k)} \bmod q,$$

where $\pi(\cdot)$ is a permutation of $\{1, \ldots, k\}$ and q denotes the order of said group, and said first number is equal to $g_{\pi(-1)}$, and said first vector of numbers is equal to $$(g_{\alpha(1)}^{\alpha_1} h^{-1}, g_{\pi(1)}^{\alpha_2} g_{\pi(2)} \cdots g_{\pi(1)}^{\alpha_k} g_{\pi(k)})$$

said demonstrating means further comprising:

randomness generating means, for generating k substantially random numbers, $(w_1, \ldots, w_k)$, each in $Z_{qi}$ initial witness computing means, for computing $$a \leftarrow h^{-w_1} g_{x(1)}^{\sum_{i=1}^{k} a^i w_i^j} \prod_{i=2}^{k} g_{\pi(i)}^{w_1};$$

response generating means, for computing k response numbers, r1, ..., rk, in response to a challenge number, c, according to $r_1 \leftarrow c\sigma + w_1 \mod q$ and $r_1 \leftarrow Cx_{\pi(i)}\delta + w_1 \mod q$ for $2 \leq i \leq k$, where $\delta$ is equal to $$\left(\left(\alpha_1 + \sum_{i=2}^{k} \alpha_i \chi_{\pi(i)}\right) - x_{\pi(1)}\right)^{-1} \mod q;$$

and transmissions means, for transmitting signals representative of at least said k response numbers.

7. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and wherein said formula, or a sub-formula of said formula, is represented by $$\left(\chi_{\pi(1)} = \alpha_1 + \sum_{i=2}^{k} \alpha_i \chi_{k(l)} \mod q\right)$$

OR $$\left(\chi_{\rho(1)} = \beta_1 + \sum_{i=1}^{k} \beta_i \chi_{\rho(i)} \mod q,\right)$$

where $\pi(\cdot)$ and $\rho(\cdot)$ are permutation of $\{1, \ldots, k\}$ and q denotes the order of said group.

8. An apparatus as in claim 7, said demonstrating means further comprising:

randomness generating means, for generating k-1 substantially random numbers, $(w_2, \ldots, w_k)$, each in $\mathbb{Z}_q$;

initial witness computing means, for computing $$a_1 \leftarrow g_{\pi(1)}^{\sum_{i=2}^{k} a_i w_i} \prod_{i=2}^{k} g_{\pi(i)}^{w_i};$$

challenge simulating means, for generating a substantially random self-chosen challenge number, $c_2$;

response simulating means, for generating k-1 substantially random self-chosen response numbers, $s_2, \ldots, s_k$;

initial witness simulating means, for computing $$a_2 \leftarrow h^{-c_2} g_{\rho(1)}^{c_2 \beta_1 + \sum_{i=2}^{k} \beta_i s_i} \prod_{i=2}^{k} g_{\rho(i)}^{s_i};$$

response generating means, for computing k-1 response numbers, $r_2, \ldots, r_{k-l}$, responsive to a challenge number, c, according to $r_i \leftarrow c_1 x_{\pi(i)} + w_i \mod q$ for $2 \leq i \leq k$, where $c_1$ is uniquely determined from c and $c_2$; and transmission means, for transmitting signals representative of at least $(r_2, \ldots r_k)$, $(s_2, \ldots, s_k)$ and one of $c_1$, $c_2$.

9. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow g_1^{x_1} \ldots g_k^{x_k}$$

where $g_1, \ldots, g_k$ are substantially random numbers in a group in which computation of discrete logarithms is substantially infeasible; and means for demonstrating to the verifier knowledge of a representation of a first number with respect to a first vector of numbers, said first number and each number in said first vector of numbers being a product of powers of numbers in the set, $\{h, g_1, \ldots, g_k\}$, and their inverses and wherein said formula is represented by a system of l<k independent linear relations, $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{ll} & \cdots & \alpha_{l,k-l} & 0 & \cdots & 0 & 1 \end{pmatrix} \begin{pmatrix} I_{\pi(1)} \\ \vdots \\ \vdots \\ I_{\pi(k)} \end{pmatrix} = \begin{pmatrix} b_1 \\ \vdots \\ \vdots \\ b_l \end{pmatrix} \mod q,$$

where $\pi(-)$ is a permutation of $\{1, \ldots, k\}$ and q denotes the order of said group, and said fist number is equal to $$\left(h \left(\prod_{i=1}^{l} g_{\pi(k-l+i)}^{b_i}\right)\right)^{-1}$$

and said first vector of numbers is equal to $$\left(g_{\pi(i)} \prod_{i=1}^{l} g_{x(k-l+i)}^{-\alpha_{i,l}}, \ldots, g_{\pi(k-l)} \prod_{i=1}^{l} g_{\pi(k-l+i)}^{-\alpha_{i,k-l}}\right).$$

10. An apparatus as in claim 9, said demonstrating means further comprising:

randomness generating means, for generating k substantially random numbers, $(w_1, \ldots, w_k)$, each in $\mathbb{Z}_q$;

initial witness computing means, for computing $$\alpha \leftarrow \prod_{i=1}^{k} g_i^{w_i};$$

correction factor generating means, for computing l correction factors, $e_1, \ldots, e_l$, according to $$e_j \leftarrow w_{\pi(k-l+j)} + \sum_{i=1}^{k-l} \alpha_{ji} w_{\pi(i)} \bmod q,$$

for $1 \leq j \leq l$;

response generating means. for computing at least k-l response numbers, each in $\mathbb{Z}_q$, in response to a challenge number, c; and transmission means, for transmitting signals representative of at least said k-l response numbers and said l correction factors.

11. An apparatus as in claim 9, said demonstrating means further comprising:

randomness generating means, for generating at least k-l+z substantially random numbers, each in $\mathbb{Z}_q$, where $1 \leq z \leq l$;

initial witness computing means, for computing an initial witness, a, from said at least k-l+z substantially random numbers;

correction factor generating means, for computing z correction factors, each in $\mathbb{Z}_q$, said correction factors satisfying a predetermined form;

response generating means, for computing at least k-l response numbers in response to a challenge number;, and transmission means, for transmitting signals representative of at least at least k-l response numbers and said z correction factors.

12. An apparatus as in claim 9, said demonstrating means further comprising:

randomness generating means, for generating k-l substantially random numbers, $(w_1, \ldots, w_{k-l})$, each in $\mathbb{Z}_q$;

initial witness computing means, for computing $$\alpha \leftarrow \prod_{i=1}^{k-l} g_{\pi(i)}^{w_i} \prod_{i=1}^{l} g_{\pi(k-l+i)}^{\sum_{j=1}^{k-l} \alpha_{ij} w_j};$$

response generating means, for computing k-l response numbers, $r_1, \ldots, r_{k-l}$, in response to a challenge number, c, according to $r_i \leftarrow cx_{\pi(i)} + w_i \bmod q$, for $1 \leq i \leq k-l$; and transmission means, for transmitting signals representative of at least said k-l response numbers.

13. An apparatus as in claim 9, wherein said formula is a sub-formula of a larger formula, said larger formula containing at least one "OR" logical connective.

14. An apparatus as in claim 9, said demonstrating means further comprising:

randomness generating means, for generating at least one substantially random number in $\mathbb{Z}_q$;

initial witness computing means, for computing an initial witness in said group;

response generating means, for computing at least one response number in $\mathbb{Z}_q$, responsive to a challenge number; and transmission means, for transmitting signals representative of at least said response numbers.

15. An apparatus as in claim 14, said demonstrating means further comprising correction factor computing means, for computing at least one correction factor in $\mathbb{Z}_q$, and said transmission means also transmitting signals representative of said at least one correction factor.

16. An apparatus as in claim 15, said challenge number being computed by application of a one-way hash function to at least h, said initial witness, at least partial information about said at least one correction factor and at least partial information about said formula.

17. An apparatus as in claim 14, said challenge number being computed by application of a one-way hash function to at least h and said initial witness.

18. An apparatus as in claim 17, said one-way hash function further being applied to a partial description of said formula.

19. An apparatus as in claim 17, said one-way hash function further being applied to a description that uniquely represents said formula.

20. A communication system comprising an apparatus for demonstrating by a prover entity to a Verifier entity that a plurality of secrets, $(x_1, \ldots, x_k)$ of the Prover, satisfy a formula from propositional logic, said formula including linear relations in said secrets and being connected by one or more logical connectives said apparatus comprising:

means for generating a public value h of said Prover, wherein $$h \leftarrow Y_1^{x_1} \ldots Y_k^{x_k} x_{k+1}^{v} \bmod n,$$

where n is the product of at least two distinct prime numbers, v is an integer, $Y_1, \ldots, Y_k$ are substantially random numbers of substantially high order in the group $Z^*_n$ and $x_{k+1}$ is a number in $Z^*_n$; and means for demonstrating knowledge to said Verifier of a representation of a first number with respect to a first vector of numbers, said first number and all but one of the numbers in said first vector of numbers being a product of powers of numbers in the set, $\{h, Y_1, \ldots, Y_k\}$, and their inverses, and the last number in said first vector of numbers being v.

21. An apparatus as in claim 20, said apparatus being operated by at least two parties, each of said at least two parties holding some but not all of said plurality of secrets.

22. An apparatus as in claim 20, wherein said formula, or a sub-formula of said formula, is represented by $$\left( x_{\pi(1)} = \alpha_1 + \sum_{i=2}^{k} \alpha_i x_{\pi(i)} \bmod v \right)$$

OR $$\left( x_{\rho(1)} = \beta_1 + \sum_{i=2}^{k} \beta_i x_{\rho(i)} \bmod v \right),$$

where $\pi(\cdot)$ and $\rho(\cdot)$ are permutations of $\{1 \ldots, k\}$.

23. An apparatus as in claim 20, wherein said formula has at least one "OR" logical connective, said apparatus further comprising simulating means for simulating, using self-chosen challenges and self-chosen responses, the demonstration of knowledge of at least one second number with respect to at least one second vector of numbers.

24. An apparatus as in claim 20, wherein said formula is represented by "$R_1$ OR ... OR $R_l$" and each sub-formula $R_i$, for $1 \leq i \leq l$, connects linear relations in said secrets by zero or more "AND" connectives and at most one "NOT" connective.

25. An apparatus as in claim 20, wherein said formula is represented by a system consisting of at least one independent linear equation and exactly one linear inequality, $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 - f_1 \epsilon \\ \vdots \\ \vdots \\ b_l - f_l \epsilon \end{pmatrix} \mod v,$$

where $\pi(\cdot)$ is a permutation of $\{1, \ldots, k\}$ and $\epsilon$ is a non-zero difference number in $\mathbb{Z}_v$, and said first number is equal to $$\prod_{i=1}^{l} Y_{\pi(k-l+i)}^{f_i},$$

and said first vector of numbers is equal to $$\left( h^{-1} \prod_{i=1}^{l} Y_{\pi(k-l+i)}^{b_i}, Y_{\pi(1)} \prod_{i=1}^{l} Y_{\pi(k-l+i)}^{-\alpha_{i,1}}, \ldots, Y_{\pi(k-l)} \prod_{i=1}^{l} Y_{\pi(k-l+i)}^{-\alpha_{i,k-l}}, v \right).$$

26. An apparatus as in claim 20, wherein said formula is represented by the linear inequality, $$x_{\pi(1)} \neq \alpha_1 + \alpha_2 x_{\pi(2)} \cdots + \alpha_k x_{\pi(k)} \mod v,$$

where $\pi(\cdot)$ is a permutation of $\{1, \ldots, k\}$, and said first number is equal to $Y_{\pi(1)}$, and said first vector of numbers is equal to $$(Y_{\pi(1)}^{\alpha_1} h^{-1} \mod n, \ Y_{\pi(1)}^{\alpha_2} Y_{\pi(2)} \mod n, \ \ldots \ Y_{\pi(1)}^{\alpha_k} Y_{\pi(k)} \mod n, \ v).$$

27. An apparatus as in claim 20, wherein said formula is represented by a system of l<k independent linear relations, $$\begin{pmatrix} \alpha_{11} & \cdots & \alpha_{1,k-l} & 1 & 0 & \cdots & 0 \\ \vdots & & \vdots & 0 & \ddots & \ddots & \vdots \\ \vdots & & \vdots & \vdots & \ddots & \ddots & 0 \\ \alpha_{l1} & \cdots & \alpha_{l,k-l} & 0 & \cdots & 0 & 1 \end{pmatrix} \begin{pmatrix} x_{\pi(1)} \\ \vdots \\ \vdots \\ x_{\pi(k)} \end{pmatrix} = \begin{pmatrix} b_1 \\ \vdots \\ \vdots \\ b_l \end{pmatrix} \mod v,$$

where $\pi(\cdot)$ is a permutation of $\{1, \ldots, k\}$, and said first number is equal to $$h \left( \prod_{i=1}^{l} Y_{\pi(k-l+i)}^{b_i} \right)^{-1} \mod n,$$

and said first vector of numbers is equal to $$\left( Y_{\pi(1)} \prod_{i=1}^{l} Y_{\pi(k-l+i)}^{-\alpha_{i,1}} \mod n, \ \ldots, \ Y_{\pi(k-l)} \prod_{z=1}^{l} Y_{\pi(k-l+i)}^{-\alpha_{i,k-l}} \mod n, \ v \right).$$

28. An apparatus as in claim 27, wherein said formula is a sub-formula of a larger formula, said larger formula containing at least one "OR" logical connective.

29. An apparatus as in claim 27, said demonstrating means further comprising:

randomness generating means, for generating at least one substantially random number in $\mathbb{Z}_v$ and one substantially random number in $\mathbb{Z}^*_n$;

initial witness computing means, for computing an initial witness in $\mathbb{Z}^*_n$;

response generating means, for computing at least one response number in $\mathbb{Z}_v$ and one response number in $\mathbb{Z}_n^*$, responsive to a challenge number; and transmission means, for transmitting signals representative of at least said response numbers.

30. An apparatus as in claim 29, said demonstrating means further comprising correction factor computing means, for computing at least one correction factor in $\mathbb{Z}_v$, and said transmission means also transmitting signals representative of said at least one correction factor.

31. An apparatus as in claim 30, said challenge number being computed by application of a one-way hash function to at least h, said initial witness, at least partial information about said at least one correction factor and at least partial information about said formula.

32. An apparatus as in claim 29, said challenge number being computed by application of a one-way hash function to at least h and said initial witness.

33. An apparatus as in claim 32, said one-way hash function further being applied to a description that uniquely represents said formula.

34. An apparatus as in claim 32, said one-way hash function further being applied to a partial description of said formula.

* * * * *

UNITED STATES PATENT AND TRADEMARK OFFICE
CERTIFICATE OF CORRECTION

PATENT NO. : 6,320,966 B1  Page 1 of 1
DATED : November 20, 2001
INVENTOR(S) : Brands, Stefanus It is certified that error appears in the above-identified patent and that said Letters Patent is hereby corrected as shown below:

<u>Title page,</u>
Insert item -- [30] Foreign Application Priority Data
              Nov. 3, 1995    [NE]    Netherlands ........................... 1001568 --

Signed and Sealed this

Eighth Day of October, 2002

*Attest:*

JAMES E. ROGAN
*Attesting Officer*         *Director of the United States Patent and Trademark Office*